US012679921B2

(12) United States Patent
Schauber et al.

(10) Patent No.: US 12,679,921 B2
(45) Date of Patent: Jul. 14, 2026

(54) CROSS-LINKED ALIPHATIC POLYKETONES

(71) Applicant: FREUDENBERG SE, Weinheim (DE)

(72) Inventors: Thomas Schauber, Weinheim (DE); Marco Sutter, Weinheim (DE); Bjoern Hellbach, Birkenau (DE); Patrick Heyer, Oberhausen Rheinhausen (DE); Kira Truxius, Darmstadt (DE); Tina Andrae, Mannheim (DE); Arthur Lanziner, Heidelberg (DE)

(73) Assignee: CARL FREUDENBERG KG, Weinheim (DE)

( * ) Notice: Subject to any disclaimer, the term of this patent is extended or adjusted under 35 U.S.C. 154(b) by 943 days.

(21) Appl. No.: 17/797,111

(22) PCT Filed: Feb. 5, 2021

(86) PCT No.: PCT/EP2021/052734
§ 371 (c)(1),
(2) Date: Aug. 3, 2022

(87) PCT Pub. No.: WO2021/156403
PCT Pub. Date: Aug. 12, 2021

(65) Prior Publication Data

US 2023/0081308 A1 Mar. 16, 2023

(30) Foreign Application Priority Data

Feb. 5, 2020 (DE) ..................... 10 2020 102 926.8
Dec. 18, 2020 (DE) ..................... 10 2020 134 187.3

(51) Int. Cl.
*C08G 4/00* (2006.01)
*C08K 3/013* (2018.01)

(52) U.S. Cl.
CPC ................ *C08G 4/00* (2013.01); *C08K 3/013* (2018.01)

(58) Field of Classification Search
CPC ................................. C08G 4/00; C08K 3/013
See application file for complete search history.

(56) References Cited

U.S. PATENT DOCUMENTS 6,887,408 B2 5/2005 Yuan
11,479,629 B2 10/2022 Schauber et al.
(Continued)

FOREIGN PATENT DOCUMENTS

CN 106633786 A 5/2017
DE 10 2018 119 446 A1 2/2020
(Continued)

OTHER PUBLICATIONS

English Translation of JP2018196933 (Year: 2018).*
(Continued)

*Primary Examiner* — Catherine S Branch
*Assistant Examiner* — Andrea Wu
(74) *Attorney, Agent, or Firm* — LEYDIG, VOIT & MAYER, LTD.

(57) ABSTRACT

A molding comprising a matrix from the crosslinking of an aliphatic polyketone with at least one diamine source as crosslinker with formation of imine groups, or a polymer mixture comprising at least one polyketone (PK) and at least one crosslinker, in which the diamine source and the at least one crosslinker are selected from di(aminophenyl) compounds in which the two aminophenyl rings are joined to one another via an aliphatic group which has a carbocyclic radical, diamine compounds selected from compounds of the formulae (I), (II) and (III), (I)

(II)

(Continued)

-continued (III)

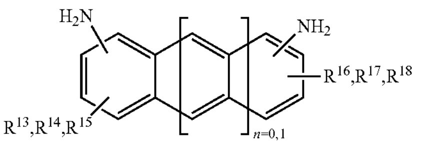

oligomers/polymers which have at least two amide groups, saturated alicyclic compounds which have at least two primary amine groups and oligomers/polymers which comprise them in incorporated form, and mixtures thereof.

27 Claims, 2 Drawing Sheets

(56) References Cited

U.S. PATENT DOCUMENTS

| | | | | |
|---|---|---|---|---|
| 2011/0139466 | A1 | 6/2011 | Chen et al. | |
| 2017/0107323 | A1 | 4/2017 | Towle et al. | |
| 2019/0189304 | A1 * | 6/2019 | Jeong | H01L 24/07 |

FOREIGN PATENT DOCUMENTS

| | | | | |
|---|---|---|---|---|
| EP | 0 118 312 | A2 | | 9/1984 |
| EP | 0 372 602 | A2 | | 6/1990 |
| JP | 2018196933 | A | * | 12/2018 |
| WO | WO 2010/011725 | A2 | | 1/2010 |
| WO | WO 2020/030599 | A1 | | 2/2020 |
| WO | WO 2020/056052 | A1 | | 3/2020 |

OTHER PUBLICATIONS

S.A. Thompson, et al., "A Novel Method for Crosslinking Polyetheretherketone", p. Journal of Applied Polymer Science, Aug. 20, 1988, pp. 1113-1120, vol. 36, No. 5, John Wiley & Sons, Inc., New York, USA.

C.E. Ash, D. H. Weinkauf, "Bonding Aliphatic Polyketone Polymers to Incompatible Polyolefins Polymers", Research Disclosure, Jan. 1, 1997, pp. 11-12, No. 393, Kenneth Mason Publications, Hampshire, United Kingdom, Great Britain.

* cited by examiner

CROSS-LINKED ALIPHATIC POLYKETONES

CROSS-REFERENCE TO PRIOR APPLICATIONS

This application is a U.S. National Phase application under 35 U.S.C. § 371 of International Application No. PCT/EP2021/052734, filed on Feb. 5, 2021, and claims benefit to German Patent Application No. DE 10 2020 102 926.8, filed on Feb. 5, 2020, and German Patent Application No. DE 10 2020 134 187.3, filed on Dec. 18, 2020. The International Application was published in German on Aug. 12, 2021 as WO 2021/156403 under PCT Article 21(2).

FIELD

The present invention relates to a molding which comprises a polymer matrix comprising a crosslinked aliphatic polyketone (PK) and also to a process for producing such a molding. The invention further relates to the use in the sectors of automotive, shipping, aerospace, rail vehicles, oil and gas industry, food and packaging industry, and medical devices, especially as sealing articles, thrust washers, backup rings, valves, connectors, insulators, snap hooks, bearings, bushes, films, powders, coatings, fibers, sealing rings and O-rings, pipes and conduits, cables, sheaths and jackets, and also housings of an electrical or chemical application which comprise such a molding or which consist of such a molding.

BACKGROUND

Thermoplastically processable plastics (thermoplastics) have become widespread by virtue of the productivity of their manufacture, the reversible deformability, and often also because of their high-grade technical properties, and they are nowadays a standard product in industrial production. They consist of substantially linear polymer chains, meaning that they are not crosslinked and in general also have little or no branching. Thermoplastics, however, have an intrinsic limit to their temperature stability and are therefore not ideally suited to all sectors where polymeric materials are used. It is therefore desirable to raise the temperature stability of thermoplastics without losing advantages, such as processing properties, good mechanical properties or high chemical resistance, for example. An advantage here is possessed often by crosslinked polymers (thermosets) in which the macromolecules are joined to one another by covalent bonds. These polymers at low temperatures are in a hard-elastic state, also referred to as the glass range. Where thermosets are heated beyond this range, they generally enter directly into the realm of thermal decomposition. Accordingly there is a great interest in developing materials which unite the advantages both of the thermoplastics and of the thermosets, meaning that the materials can be deformed inexpensively while at the same time exhibiting high heat distortion resistance.

Aliphatic polyketones (PKs) are thermoplastics which exhibit good mechanical properties, particularly a high impact strength and good media resistance. They have an alternating construction in which each ethylene or propylene group is followed by a keto group (carbonyl group), with the fractions of the propylene groups being generally low and variable. PKs are notable especially for good strength properties, high impact strength values at low temperatures, high mechanical cycling resistance, a low propensity toward creep deformation, and also good sliding and wear behavior.

Aliphatic polyketones (PKs) are polymers of linear construction which are produced from carbon monoxide and α-olefins, with a strictly alternating arrangement of the monomeric units in the polymeric chain.

Nowadays use is made almost exclusively of polyketone terpolymers rather than the conventional polyketone copolymers produced only from carbon monoxide and ethylene. These polyketone terpolymers consist of carbon monoxide, ethylene and preferably small amounts of propylene.

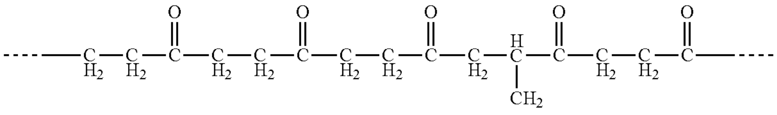

The reason for the use of ter-rather than copolymers lies in the significantly reduced brittleness of the terpolymers. On account of the polymer chain with its strictly alternating construction and extremely low defect rate (one defect per million monomeric units) and also the high number of polar keto groups, polyketone copolymers consisting of carbon monoxide and ethylene are highly crystalline, very hard but also very brittle, thus significantly limiting their possible applications as a polymeric material. Through the addition of small amounts of propylene (about 5%) during the synthesis, it has been possible to disrupt the crystallinity in such a way that the melting point is lowered from 255° C. (copolymer of carbon monoxide and ethylene) to 220° C. (terpolymer) and the polymer obtained is extremely tough rather than being brittle. The qualities of aliphatic polyketones include a high impact strength, low creep behavior, high chemical resistance, and good tribological properties. However, the PKs also exhibit the aforementioned intrinsic limit on temperature stability as is typical of thermoplastics. Consequently it is disadvantageous to use the PKs for the maximum sustained service temperature of about 80° C. to 100° C. (heat distortion temperature HDT/A according to ISO 75). The possible applications of this class of polymer, accordingly, are significantly limited.

It would therefore be advantageous if it were possible to raise the sustained service temperature of the aliphatic polyketones. In order to achieve further increases in the temperature resistance and the mechanical stability of the PKs, proposals have been made to crosslink the polymer chains. This principle has already been successfully employed for polyaryl ether ketones (PAEKs).

Aliphatic polyketones differ from polyaryl ether ketones (PAEKs), such as polyetheretherketones (PEEKs), for example, in that they contain no aromatic rings and no ether groups. Polyaryl ether ketones (PAEKs), such as polyetheretherketones (PEEKs), are high-performance semicrystalline polymers which have a high temperature stability and media resistance. They consist of alternating keto, ether and aryl groups. An advantage of the PAEKs is the facility for thermoplastic processing. However, thermoplastics exhibit an intrinsic limit in relation to the temperature stability. In order to raise the temperature stability and the mechanical stability of the PAEKs, proposals have been made to crosslink the polymer chains. The prior art performs crosslinking using processes wherein the PAEKs are crosslinked with diamines. This results in formation of imine bonds (Schiff bases) which are able to endow the crosslinked polymers with a higher stability. A disadvantage is that such crosslinked polymers are not flowable. Consequently they cannot readily be processed thermoplastically from a melt of the polymer.

The process for the chemical crosslinking of polyetheretherketones (PEEKs) with diamines has been known since the 1980s. In that case polyetheretherketone is first modified by attachment of para-phenylenediamine in a diphenyl sulfone solvent. The solvent must then be removed by drying and further purification. A problem is that in the process described, and also during the covalent attachment, crosslinks are already formed. In this case there is indeed an increase in the temperature stability, but the glass transition temperature rises as well and the facility for thermoplastic processing is lost. The polymer material obtained is therefore crosslinked not thermoplastically from the melt, but instead by compression molding.

It is also known practice first to modify the PAEK by analogous reaction of PEEK and phenylenediamine in a diphenyl sulfone solvent, and to carry out crosslinking following removal of the solvent and purification, by compression molding. Again no thermoplastic processing is described. Investigation shows the products to have a higher stability than noncrosslinked PEEK, this stability nevertheless being still deserving of improvement.

WO 2010/011725 A2 describes a multiplicity of aminic crosslinkers for crosslinking PAEK. The document, however, contains only a single synthesis example describing the crosslinking of PAEK with diphenylamine, in accordance with the literature cited above, in which first of all there is a reaction in a diphenyl sulfone solvent.

A process for the crosslinking of PAEK with nonaminic crosslinkers is proposed in U.S. Pat. No. 6,887,408 B2.

In order to crosslink PAEK, there have also been proposals in the prior art to functionalize the polymers themselves with crosslinkable amino groups. Processes of this kind are described for example in US 2017/0107323 A1. A disadvantage here is that the functionalization of the PAEKs with amino groups is relatively complicated. Moreover, functionalized PAEK cannot be crosslinked in such a readily and variably controllable way as with a low molecular mass crosslinker.

WO2020/056052 describes crosslinkable polymer compositions comprising at least one aromatic polymer and at least one crosslinking compound which is capable of crosslinking the at least one aromatic polymer. Crosslinking compounds used are derivatives of fluorenes, diphenylmethanes and dihydroanthracenes.

The processes described in the prior art for crosslinking PAEK with diamines as low molecular mass crosslinkers are carried out in the presence of a high fraction of solvent, with the moldings being produced by compression molding. The products are more temperature-stable than comparable noncrosslinked PAEKs. A disadvantage, however, is that PAEK crosslinked in this way has a relatively low stiffness, as the crystallinity of the PAEK is lost when the polymers are dissolved in the solvent. On further processing, at best a small fraction of the crystallinity may be recovered because of the intrinsic steric hindrance of the chains by the crosslinking sites. A further disadvantage is that the processes overall are very complicated, since they also require a multiplicity of unit operations because of the removal of the solvent. The fact that the moldings are produced by compression molding is a further disadvantage, which limits the possible applications by comparison with thermoplastic processing. Compression molding and comparable processes are carried out with materials which are not flowable and which cannot be converted into thermoplastic melts. As a result, deformability is restricted and it is not possible to produce thin-walled or complex moldings. For these reasons, such processes also have very limited capacity for automation. On the basis of the known solvent-based processes, therefore, it is not possible to carry out efficient and cost-effective industrial production.

WO 2010/011725 A2 describes very generally the production of moldings from crosslinked PAEKs by extrusion. This, however, is only a theoretical approach, as products are produced only on a laboratory scale and by compression molding. No evidence is provided that the PAEKs crosslinked using low molecular mass crosslinkers are extrudable, let alone that products having advantageous properties can be obtained in this case. For a skilled person, moreover, there is no commensurate expectation of success in the possibility of plastifying PAEKs and amino-containing crosslinkers in an extruder and then subjecting them to a shaping step. To start with a problem is that crosslinking begins already at the high melting temperatures which are needed and under which the components must be mixed and processed. Furthermore, there was no expectation of miscibility and processability of PAEKs in the absence of a solvent with such aminic crosslinkers. In practice, the incorporation of low molecular mass components into polymers is frequently accompanied by observations of separation events. The homogeneous distribution of the crosslinker in the polymer, however, is vital to the acquisition of a stable product.

WO2020/030599 A2 describes a process for producing a crosslinked molding containing PAEK, where the crosslinker is a di(aminophenyl) compound in which the two aminophenyl rings are joined to one another via an aliphatic group which has a carbocyclic radical. The crosslinker component used specifically is 1-(4-aminophenyl)-1,3,3-trimethylindan-5-amine DAPI (CAS No. 54628-89-6), the isomer mixture with 1-(4-amino-phenyl)-1,3,3-trimethylindan-6-amine, or the isomer mixture with CAS No. 68170-20-7. A first disadvantage is the high cost of producing the crosslinker. Secondly the physicochemical properties of the PAEK crosslinked with DAPI are deserving of improvement.

Like the polyaryl ether ketones, the aliphatic polyketones as well contain keto groups which can react with amines to form Schiff bases. However, since aliphatic polyketones exhibit a tendency at elevated temperatures toward tautomerization of their keto groups into enol forms corresponding to them, and then toward an uncontrollable onward reaction of these enol groups, these reactions typically compete dominantly with the crosslinking, and accordingly the possibility of transposing the above-stated process to aliphatic polyketones is less likely. It would, however, be highly desirable to obtain crosslinked aliphatic polyketones, since they would be distinguished by properties including improved mechanical properties and also an improved heat distortion resistance, reduced creep behavior, and increased chemical resistance.

Since, moreover, volatile diamines at high temperatures entail considerable risks for the user and a high degree of environmental burden, it would also be desirable to design the above-described process and the reagents used therein in such a way that there was no risk to users and environment.

SUMMARY

A first subject of the invention is a molding comprising a matrix from the crosslinking of an aliphatic polyketone with at least one diamine source as crosslinker with formation of imine groups, the diamine source being selected from

- di(aminophenyl) compounds in which the two aminophenyl rings are joined to one another via an aliphatic group which has a carbocyclic radical,
- diamine compounds selected from compounds of the formulae (I), (II) and (III), (I)

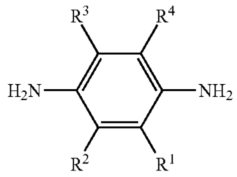

(II)

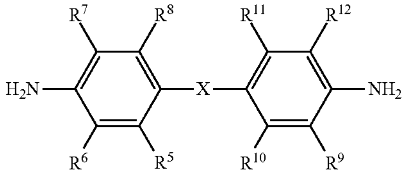

(III)

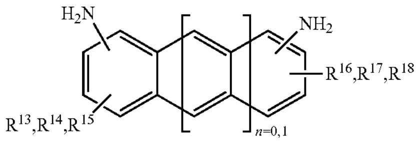

where $R^1$, $R^2$, $R^3$ and $R^4$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, $R^5$, $R^6$, $R^7$, $R^8$, $R^9$, $R^{10}$, $R^{11}$ and $R^{12}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, $R^{13}$, $R^{14}$, $R^{15}$, $R^{16}$, $R^{17}$ and $R^{18}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxyl, carboxyl, amino, $C_6$-$C_{12}$ aryl, where the aryl group is unsubstituted or substituted by $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl,

- oligomers/polymers which have at least two amide groups,
- saturated alicyclic compounds which have at least two primary amine groups, oligomers/polymers which comprise them in incorporated form, and
- mixtures thereof.

A further subject of the invention is a process for producing a molding, comprising the steps of i) providing a mixture comprising at least one aliphatic polyketone and at least one crosslinker, ii) producing a molding from the mixture obtained in step i), and iii) thermally treating the molding at a temperature at which the aliphatic polyketone becomes crosslinked, and where the crosslinker is selected from

- di(aminophenyl) compounds in which the two aminophenyl rings are joined to one another via an aliphatic group which has a carbocyclic radical,
- diamine compounds selected from compounds of the formulae (I), (II) and (III), (I)

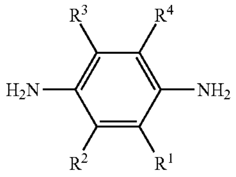

(II)

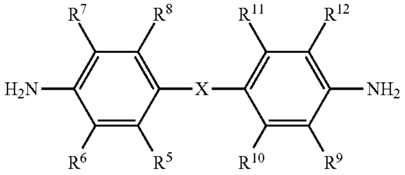

(III)

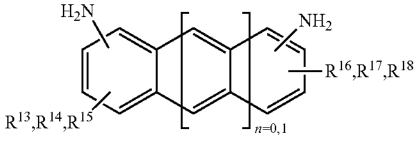

where $R^1$, $R^2$, $R^3$ and $R^4$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, $R^5$, $R^6$, $R^7$, $R^8$, $R^9$, $R^{10}$, $R^{11}$ and $R^{12}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, $R^{13}$, $R^{14}$, $R^{15}$, $R^{16}$, $R^{17}$ and $R^{18}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxyl, carboxyl, amino, $C_6$-$C_{12}$ aryl, where the aryl group is unsubstituted or substituted by $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, oligomers/polymers which have at least two amide groups, saturated alicyclic compounds which have at least two primary amine groups, oligomers/polymers which comprise them in incorporated form, and mixtures thereof.

Also a subject of the invention are the moldings obtained by this process.

A further subject are polymer mixtures comprising at least one polyketone (PK) and at least one crosslinker selected from di(aminophenyl) compounds in which the two aminophenyl rings are joined to one another via an aliphatic group which has a carbocyclic radical, diamine compounds selected from compounds of the formulae (I), (II) and (III), (I)

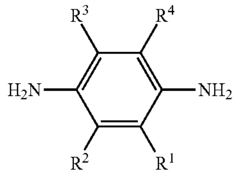

(II)

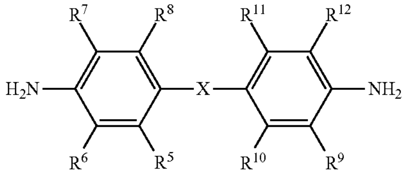

(III)

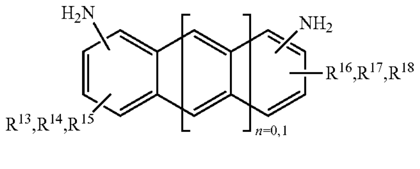

where $R^1$, $R^2$, $R^3$ and $R^4$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, $R^5$, $R^6$, $R^7$, $R^8$, $R^9$, $R^{10}$, $R^{11}$ and $R^{12}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, $R^{13}$, $R^{14}$, $R^5$, $R^{16}$, $R^{17}$ and $R^{18}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxyl, carboxyl, amino, $C_6$-$C_{12}$ aryl, where the aryl group is unsubstituted or substituted by $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, oligomers/polymers which have at least two amide groups, saturated alicyclic compounds which have at least two primary amine groups, and oligomers/polymers which comprise them in incorporated form, and mixtures thereof.

A further subject of the invention is the use of a molding as defined above and hereinafter, or obtainable by a process as defined above and hereinafter, in the sectors of automotive, shipping, aerospace, rail vehicles, oil and gas industry, food and packaging industry, and medical devices, more particularly as sealing articles, thrust washers, back-up rings, valves, connectors, insulators, snap hooks, bearings, bushings, films, powders, coatings, fibers, sealing rings and O-rings, pipes and conduits, cables, sheaths and jackets, and also housings of an electrical or chemical application which consist of a molding of the invention or molding obtained by the process of the invention or which comprise such a molding.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DESCRIPTION OF THE INVENTION

Figure 1:
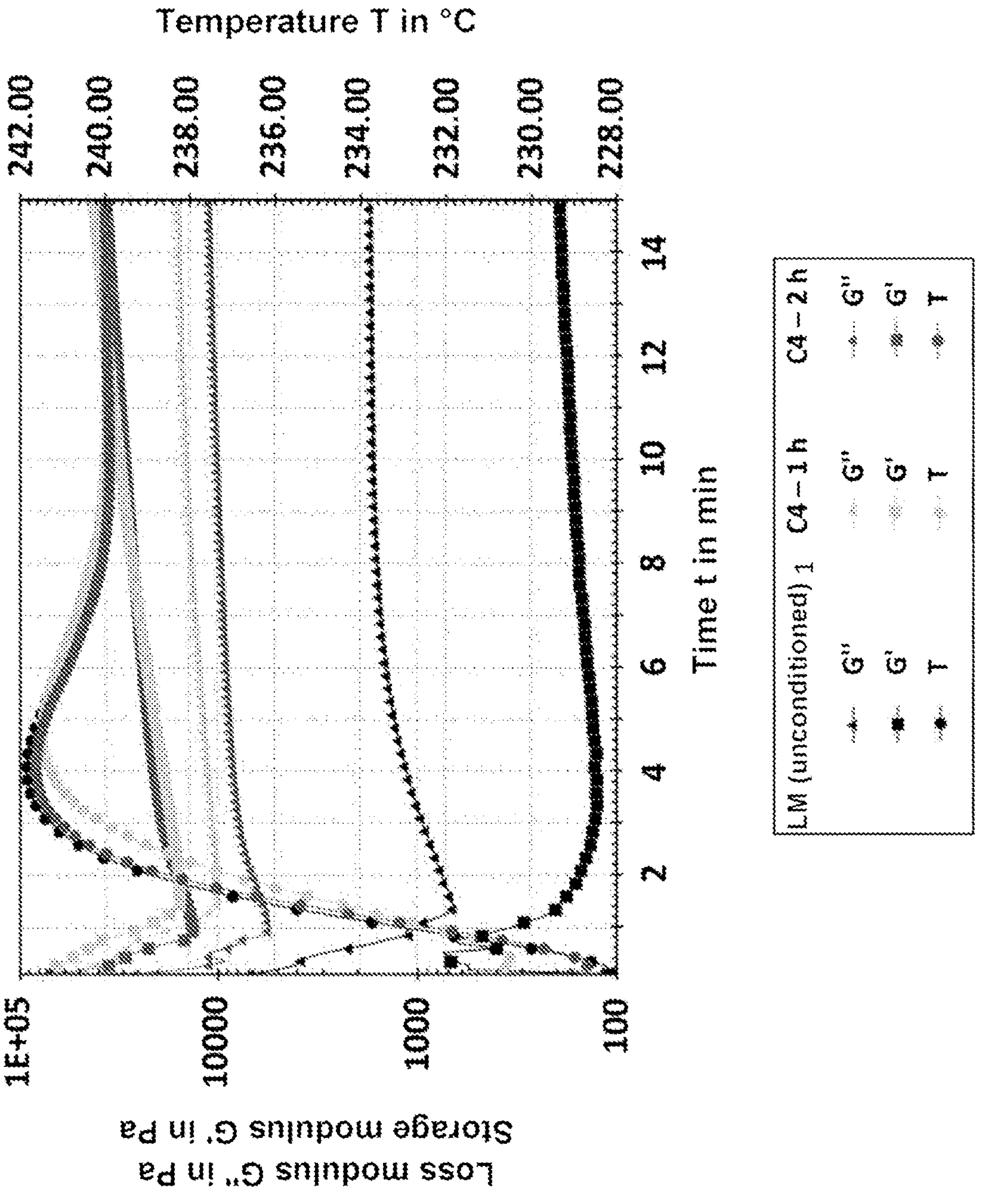
FIG. 1: Results of the rheological studies on two moldings of the invention (PK with 1.00% DAPI, aftertreated thermally for 1 h, described in working example 2 (dark gray lines) and PK with 1.00% DAPI, thermally aftertreated for 2 h, described in working example 3 (pale gray lines)) in comparison to the standard base material (PK without thermal treatment (black lines)). The storage modulus G' (symbol: square) and the loss modulus G" (symbol: triangle) are represented on the Y-axis. The measuring time is represented on the X-axis.

The invention is based on the object of providing processes and moldings which overcome the disadvantages described above.

The intention, then, is to provide materials based on aliphatic polyketone (PK) that exhibit improved temperature stability, relatively low flammability and higher stiffness (modulus) at high temperatures. They are also to have good resistance toward chemicals, and low propensity toward creep.

The invention is based more particularly on the object of providing moldings which comprise materials having an improved stability but which nevertheless have good processing qualities. These materials are to be producible in a simple way, efficiently and inexpensively, and in particular are to be amenable to thermoplastic processing. Inefficient processes, such as compression molding, for example, are to be avoidable here.

The processes are also to be able to be carried out as far as possible in an environmentally benign way and without risk to the users.

Surprisingly the object on which the invention is based is achieved by processes, moldings and sealing articles where a polyketone is crosslinked to a crosslinking with a specific diamine source with formation of imine groups. It is possible here first to subject a plastified mixture of polyketone and diamine source to a shaping process for producing a molding. The molding may subsequently be subjected to crosslinking.

In the text below, the terms “crosslinker” and “diamine source” are used synonymously.

The molding of the invention and also the process of the invention have advantages as follows:

- Potentially environmentally harmful substances and those harmful to health, such as volatile aromatic amines, for example, are avoided in the case of the process of the invention.
- The crosslinked polyketones used in the invention and the moldings of the invention are notable for increased temperature stability and a higher maximum service temperature than noncrosslinked PKs.
- The process of the invention is notable for low costs. The diamine sources used in the invention are commercially available basic substances, with generally low production costs.
- The polyamides can serve as a source of low molecular mass polyamides and diamines. Reaction conditions determine which crosslinker component is formed from the polyamides. Through the use of polyamides as diamine source it is also possible accordingly to crosslink PKs with low-boiling aliphatic diamines that would otherwise not be amenable to reaction, for technological reasons of process/safety/environment.
- The process of the invention is simple to implement technically, requiring the conveying and mixing of only two components (preferably two pellet formulations).
- The moldings of the invention have good tribological properties, especially very good abrasion behavior. They are suitable for materials for use under abrasive wear conditions—for example, as seals and friction bearing materials in conveying installations for aggressive and abrasive media.
- The molding of the invention exhibits relatively low swelling.
- Because of the long-established components used, there is no need for a Reach application for the polymers.
- The process of the invention is sustainable. The noncrosslinked residual substances can be recycled easily and effectively and do not need to be passed on for disposal.

Polyketone

The polymer component used may in principle comprise any aliphatic polyketones. Aliphatic polyketones (PKs) in the invention are polymers with a linear construction which are produced from carbon monoxide and α-olefins, with the monomeric units having an alternating arrangement, preferably strictly alternating arrangement, in the polymeric chain. The aliphatic polyketone differs from polyaryl ether ketones (PAEKs), such as polyetheretherketones (PEEKs), in that it contains no aromatic rings and no ether groups. PKs preferred in the invention are polyketone terpolymers. These polyketone terpolymers consist of carbon monoxide, ethylene and preferably small amounts of propylene.

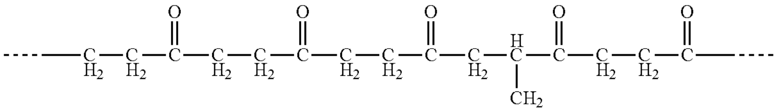

In the invention the aliphatic polyketones have linear polymer chains, consisting of alternating alkylene units and keto groups. The alkylene units comprise preferably ethylene units as main component, more preferably ethylene units as main component combined with 1-methylethylene units. The aliphatic polyketones may differ in their average molecular weight and also in the ratio of the reactants used for producing them, namely carbon monoxide, ethylene and a further alkene, such as propylene or 1- and/or 2-butylene, for example. The aliphatic polyketones have keto groups which can be joined with formation of imine bonds. Mixtures of different aliphatic polyketones may also be used in the invention, differing for example in their molecular weight or their composition. It is preferred, however, to employ a single PK, since in that way a higher crystallinity and associated temperature stability can be achieved.

In one preferred embodiment the aliphatic polyketone possesses an average mean molar weight $M_n$ (number average) in the range from 60 000 g/mol to 100 000 g/mol and/or an average mean molar weight Mw (mass average) in the range from 132 000 g/mol to 320 000 g/mol (ascertained by GPC measurements). The polydispersity of the aliphatic polyketones is preferably between 2.2 and 3.2. The aliphatic polyketones preferably have additionally a glass transition point of 10 to 14° C., a melting point of 218 to 226° C. and/or a recrystallization temperature of 170 to 182° C. (ascertained by DSC, DIN EN ISO 11357-1 to 3, 20° C./min heating rate). It has been found that PK crosslinked in accordance with the invention has particularly advantageous properties, especially improved mechanical and chemical properties.

The aliphatic polyketone (PK) preferably at 240° C. has a melt flow index (MFR) in the range from 2 $cm^3$/10 min to 200 $cm^3$/10 min, more particularly of 6 $cm^3$/10 min to 60 $cm^3$/10 min. The measurement is made in accordance with DIN ISO 1133, with the material being melted at 240° C. and loaded with a 2.16 kg piston, after which the flowability is determined. An example of particularly suitable aliphatic polyketone is, for example, M330A from Hyosung. The melt flow index correlates in general with the molecular weight of the polymer chains. It has been found that a melt flow index of this kind is advantageous, since in accordance with the invention both good thermoplastic processing properties and miscibility are achieved and it is possible to achieve a homogeneous product with high stability, and more particularly high stiffness.

Suitable PKs are available commercially, e.g. M230A (MFR=150 g/10 min at 240° C. and 2.16 kg), M330A (MFR=60 g/10 min at 240° C. and 2.16 kg), M340A (MFR=60 g/10 min at 240° C. and 2.16 kg), M630A (MFR=6 g/10 min at 240° C. and 2.16 kg) and M640A (MFR=6 g/10 min at 240° C. and 2.16 kg) from Hyosung Corporation Co., Ltd. and also AKROTEK® PK-VM (MFR=60 g/10 min at 240° C. and 2.16 kg), AKROTEK® PK-HM (MFR=6 g/10 min at 240° C. and 2.16 kg) and AKROTEK® PK-XM (MFR=2 g/10 min at 240° C. and 2.16 kg) from AKRO-PLASTIC GmbH.

It is particularly preferred here to use a PK of this kind having a melt flow index as stated above, and the crosslinker in an amount of 0.05 wt % to 15 wt %, more particularly 0.1 wt % to 5 wt %, based on the total amount of PK and crosslinker. In one preferred embodiment the fraction of the crosslinker is 0.1 to 1.5 wt %, more particularly 0.4 to 1.0 wt %, based on the total amount of PK and crosslinker. With a proportion of this kind and with these kinds of properties on the part of the starting materials, it is possible to achieve particularly good processing properties on the part of the products. More particularly the stiffness is particularly high, characterized by a high tensile modulus. Moreover, a PK of this kind can be processed at a temperature which still permits thermoplastic mixing with the crosslinker, without the crosslinking reaction proceeding too rapidly during the provision of the mixing (=step i)). As a result, a plastified material is obtained which can be employed very well in a shaping operation for producing a molding (=step ii)). The moldings thus obtained can be subjected subsequently to thermoplastic treatment (=step iii)), in which the ultimate properties of the material are obtained by crosslinking of the PK.

Preferably in the invention the molding is a molding based on PK. "Based on PK" here means that the PK is the essential structure-imparting polymer component of the molding. In one embodiment the PK is preferably the only polymer component of the molding. In another embodiment the PK is present in a mixture with further polymers, especially thermoplastic polymers. Preferred further polymers include thermoplastic polyurethanes (TPU) and also other thermoplastic elastomers, polyesters, liquid-crystalline polyesters (LCP), polybutylene terephthalate (PBT), polyethylene terephthalate (PET) and polycarbonate (PC). Preferred mass ratios between PK and the further polymers, especially thermoplastic further polymers, are 1:1 to 100:1, preferably 5:1 to 100:1, more preferably 10:1 to 100:1. The molding may further comprise fillers such as, for example, fibers and/or customary additives, such as processing aids, and/or functional components. The crosslinked PK forms a matrix in which any additives present are in uniform distribution.

Crosslinker

The at least one crosslinker preferably comprises at least 80 wt %, more particularly at least 90 wt %, especially at least 99 wt %, based on the total weight of the crosslinker, of a diamine source which is selected from di(aminophenyl) compounds in which the two aminophenyl rings are joined to one another via an aliphatic group which has a carbocyclic radical, diamine compounds selected from compounds of the formulae (I), (II) and (III), oligomers/polymers which have at least two amide groups, saturated alicyclic compounds which have at least two primary amine groups, oligomers/polymers which comprise them in incorporated form, and mixtures thereof.

In one preferred embodiment the at least one crosslinker comprises at least 80 wt %, more particularly at least 90 wt %, especially at least 99 wt %, based on the total weight of the crosslinker, of a diamine source which is selected from oligomers/polymers which have at least two amide groups, saturated alicyclic compounds which have at least two primary amine groups, oligomers/polymers which comprise them in incorporated form, and mixtures thereof.

The amount of the crosslinker is established in relation to the desired degree of crosslinking. The fraction of the crosslinker is preferably 0.05 wt % to 15 wt %, more particularly 0.1 wt % to 5 wt %, based on the total amount of aliphatic polyketone and crosslinker. In one preferred embodiment the fraction of the crosslinker is 0.1 to 1.5 wt %, more particularly 0.4 to 1.0 wt %. It has been found that the stability of the product having such a crosslinker fraction can be particularly advantageous.

In one preferred embodiment the crosslinker has a boiling point at 1013 mbar which is at least 300° C., more particularly at least 350° C., in one specific configuration at least 400° C. This is advantageous since such crosslinkers exhibit only relatively low vapor pressure at the high processing temperatures required. The boiling point of the crosslinker at 1013 mbar is preferably in a range from 300° C. to 500° C., more particularly in a range from 350° C. to 500° C. The melting point of the crosslinker is advantageously below the melting point of the aliphatic polyketone (PK). As a result, good processing properties and low risk to the users are achieved.

In one preferred embodiment the diamine source used as crosslinker is an oligomer/polymer having at least two amide groups.

In the text below, the term "polyamide" is used synonymously with an oligomer/polymer having at least two amide groups.

Where the polyamides are referred to below as crosslinkers, this term also embraces the products of lower molecular weight that are formed during the reaction in the process of the invention (e.g., from hydrolytic cleavage of amide groups to form amine groups capable of reacting with the keto groups of the PK), insofar as these products are capable of crosslinking the PKs. Accordingly, crosslinkers used may be not only the polyamides used for providing the mixture of PK and crosslinker but also any desired amine-containing oligomers and diamine monomers thereof.

The designation "polyamides" brings together, below, homopolyamides and copolyamides. To designate the polyamides, the invention sometimes uses common technical abbreviations made up of the letters PA with following numbers and letters. Some of these abbreviations are defined in DIN EN ISO 1043-1. Polyamides which may be derived from aminocarboxylic acids of the type $H_2N—(CH_2)_z—COOH$ or from the corresponding lactams are labeled PA Z, where Z denotes the number of carbon atoms in the monomer. For example, PA 6 stands for the polymer of ε-caprolactam or of ε-aminocaproic acid. Polyamides which can be derived from diamines and dicarboxylic acids of the types $H_2N—(CH_2)_x—NH_2$ and $HOOC—(CH_2)_y—COOH$ are labeled PA xy, where x denotes the number of carbon atoms in the diamine and y the number of carbon atoms in the dicarboxylic acid. To designate copolyamides, the components are listed in the order of their proportions, separated by obliques. For example, PA 66/610 is the copolyamide of hexamethylenediamine, adipic acid and sebacic acid. For the monomers used in the invention with an aromatic or cycloaliphatic group, the following letter codes are used: T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis(cyclohexylamine).

The polyamides can be described by the monomers used in their production. A polyamide-forming polymer is a monor suitable for polyamide formation.

In one preferred embodiment the crosslinker comprises is a polymer which have at least two amide groups, where the polymer in copolymerized form polyamide-forming monomers which are selected from A) unsubstituted or substituted aromatic dicarboxylic acids and derivatives of unsubstituted or substituted aromatic dicarboxylic acids,
B) unsubstituted or substituted aromatic diamines,
C) aliphatic or cycloaliphatic dicarboxylic acids,
D) aliphatic or cycloaliphatic diamines,
E) monocarboxylic acids,
F) monoamines,
G) at least trivalent amines,
H) lactams,
I) ω-amino acids, and
K) compounds different from A) to I) and cocondensable therewith, and mixtures thereof.

Crosslinkers used in one preferred embodiment of the invention are polyamides, preferably having a melting point of at most 260° C. Aliphatic polyamides are used more particularly. In this regard the proviso applies that there must be at least one of the components A) or B) and at least one of the components C) or D) present. In a specific embodiment the proviso applies that there must be at least one component A) and at least one component D) present.

The aromatic dicarboxylic acids A) are preferably selected from respectively unsubstituted or substituted phthalic acid, terephthalic acid, isophthalic acid, naphthalenedicarboxylic acids or diphenyldicarboxylic acids and the derivatives and mixtures of the aforesaid aromatic dicarboxylic acids. Substituted aromatic dicarboxylic acids A) have preferably at least one $C_1$-$C_4$ alkyl radical. More preferably substituted aromatic dicarboxylic acids A) have one or two $C_1$-$C_4$ alkyl radicals. These radicals are preferably selected from methyl, ethyl, n-propyl, isopropyl, n-butyl, isobutyl, sec-butyl and tert-butyl, more preferably methyl, ethyl and n-butyl, very preferably methyl and ethyl, and more particularly methyl. Substituted aromatic dicarboxylic acids A) may also carry further functional groups which do not disrupt the amidation, such as, for example, 5-sulfoisophthalic acid, its salts and derivatives. Preferred among these is the sodium salt of dimethyl 5-sulfoisophthalate. The aromatic dicarboxylic acid A) is preferably selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid. Aromatic dicarboxylic acid A) used with particular preference is terephthalic acid, isophthalic acid or a mixture of terephthalic acid and isophthalic acid.

The aromatic diamines B) are preferably selected from bis(4-aminophenyl)methane, 3-methylbenzidine, 2,2-bis(4-aminophenyl)propane, 1,1-bis(4-aminophenyl)cyclohexane, 1,2-diaminobenzene, 1,4-diaminobenzene, 1,4-diaminonaphthalene, 1,5-diaminonaphthalene, 1,3-diaminotoluene(s), m-xylylenediamine, N,N'-dimethyl-4,4'-biphenyldiamine, bis(4-methylaminophenyl)methane, 2,2-bis(4-methylaminophenyl)propane or mixtures thereof. Aromatic diamine used with particular preference is m-xylylenediamine.

The aliphatic or cycloaliphatic dicarboxylic acids C) are preferably selected from oxalic acid, malonic acid, succinic acid, glutaric acid, adipic acid, pimelic acid, suberic acid, azelaic acid, sebacic acid, undecane-1,11-dicarboxylic acid, dodecane-1,12-dicarboxylic acid, maleic acid, fumaric acid or itaconic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The aliphatic or cycloaliphatic diamines D) are preferably selected from ethylenediamine, propylenediamine, tetramethylenediamine, pentamethylenediamine, hexamethylenediamine, heptamethylenediamine, octamethylenediamine, nonamethylenediamine, 2-methyl-1,8-octamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-aminocyclohexyl)methane, 3,3'-dimethyl-4,4'-diaminodicyclohexylmethane and mixtures thereof.

The diamine D) is with particular preference selected from hexamethylenediamine, 2-methylpentamethylenediamine, octamethylenediamine, nonamethylenediamine, decamethylenediamine, undecamethylenediamine, dodecamethylene-diamine, bis(4-aminocyclohexyl)methane, 2,2-bis(4-aminocyclohexyl)propane, 1,3-bis(aminomethyl)cyclohexane and 1,4-bisaminomethylcyclohexane, 5-amino-2,2,4-trimethyl-1-cyclopentanemethylamine, 5-amino-1,3,3-trimethylcyclohexanemethylamine (isophoronediamine), 3,3'-dimethyl-4,4'-diaminodicyclohexylmethane, [3-(aminomethyl)-2-bicyclo[2.2.1]heptanyl]methanamine, aminated dimer fatty acids and mixtures thereof. In one preferred embodiment of the invention the aqueous solution comprises at least one diamine D) selected from hexamethylenediamine, bis(4-aminocyclohexyl)methane (PACM), 3,3'-dimethyl-4,4'-diaminodicyclohexylmethane (MACM), isophoronediamine (IPDA) and mixtures thereof.

The monocarboxylic acids E) serve for the endcapping of the polyamide oligomers used in the invention. Suitability is possessed in principle by all monocarboxylic acids which are capable of reacting with at least some of the available amino groups under the reaction conditions of the polyamide condensation. Suitable monocarboxylic acids E) are aliphatic monocarboxylic acids, alicyclic monocarboxylic acids and aromatic monocarboxylic acids. They include acetic acid, propionic acid, n-, iso- or tert-butyric acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, 1-naphthalenecarboxylic acid, 2-naphthalenecarboxylic acid, phenylacetic acid, oleic acid, ricinoleic acid, linoleic acid, linolenic acid, erucic acid, fatty acids from soybean, linseed, castor bean and sunflower, acrylic acid, methacrylic acid, tertiary saturated monocarboxylic acids (for example, Versatic® acids from Royal Dutch Shell plc) and mixtures thereof.

Where unsaturated carboxylic acids or their derivatives are used as monocarboxylic acids E), it may be sensible to add commercial polymerization inhibitors to the aqueous solution. The monocarboxylic acid E) is very preferably selected from acetic acid, propionic acid, benzoic acid and mixtures thereof. In one especially preferred embodiment the aqueous solution contains exclusively acetic acid as monocarboxylic acid E). In another especially preferred embodiment the aqueous solution contains exclusively propionic acid as monocarboxylic acid E). In another especially preferred embodiment the aqueous solution contains exclusively benzoic acid as monocarboxylic acid E).

The monoamines F) serve here for endcapping the polyamide oligomers used in the invention. Suitability is possessed in principle by all monoamines which are capable of reacting with at least some of the available carboxylic acid groups under the reaction conditions of the polyamide condensation. Suitable monoamines F) are aliphatic monoamines, alicyclic monoamines and aromatic monoamines. They include methylamine, ethylamine, propylamine, butylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

Suitable at least trivalent amines G) are selected from N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)-3,5,5-trimethylcyclohexyl]hexane-1,6-diamine, N'-[3-(aminomethyl)-3,5,5-trimethylcyclohexyl]dodecane-1,12-diamine, N'-[(5-amino-1,3,3-trimethylcyclohexyl)methyl]hexane-1,6-diamine, N'-[(5-amino-1,3,3-trimethyl-cyclohexyl)methyl]dodecane-1,12-diamine, 3-[[[3-(aminomethyl)-3,5,5-trimethylcyclohexyl]amino]methyl]-3,5,5-trimethylcyclohexanamine, 3-[[(5-amino-1,3,3-trimethylcyclohexyl)methylamino]methyl]-3,5,5-trimethylcyclohexanamine, 3-(amino-methyl)-N-[3-(aminomethyl)-3,5,5-trimethylcyclohexyl]-3,5,5-trimethylcyclohexanamine. Preferably no at least trivalent amines G) are used.

Suitable lactams H) are ε-caprolactam, 2-piperidone (δ-valerolactam), 2-pyrrolidone (γ-butyrolactam), caprolactam, enantholactam, laurolactam and mixtures thereof.

Suitable ω-amino acids I) are 6-aminocaproic acid, 7-aminoheptanoic acid, 11-aminoundecanoic acid, 12-aminododecanoic acid and mixtures thereof.

Suitable compounds K) different from A) to I) and cocondensable therewith are at least tribasic carboxylic acids, diaminocarboxylic acids, etc. Suitable compounds K) are, additionally, 4-[(Z)—N-(6-aminohexyl)-C-hydroxycarbonimidoyl]benzoic acid, 3-[(Z)—N-(6-aminohexyl)-C-hydroxycarbonimidoyl]benzoic acid, (6Z)-6-(6-aminohexylimino)-6-hydroxyhexanecarboxylic acid, 4-[(Z)—N-[(5-amino-1,3,3-trimethylcyclohexyl)methyl]-C-hydroxycarbonimidoyl]benzoic acid, 3-[(Z)—N-[(5-amino-1,3,3-trimethylcyclohexyl)methyl]-C-hydroxycarbonimidoyl]benzoic acid, 4-[(Z)—N-[3-(aminomethyl)-3,5,5-trimethylcyclohexyl]-C-hydroxycarbonimidoyl]benzoic acid, 3-[(Z)—N-[3-(aminomethyl)-3,5,5-trimethylcyclohexyl]-C-hydroxycarbonimidoyl]benzoic acid and mixtures thereof.

In a further preferred embodiment of the invention a crosslinker is used which is selected from polyamides, copolymers thereof and mixtures thereof and has a melting range of 200° C. to 250° C., preferably a melting range of 220° C. to 240° C., more particularly a melting range of 220° C. to 230° C.

Another preferred embodiment sees the at least one crosslinker selected from a saturated alicyclic compound which has at least two primary amine groups and from oligomers/polymers which comprise them in incorporated form. Suitable compounds are those whose boiling point is greater than 300° C. In one preferred embodiment these compounds in step i) are present as a liquid. They are able accordingly to serve as an internal solvent during melt-mixing. The saturated alicyclic compound is preferably an aminized fatty acid dimer (dimer fatty acid).

The expression "fatty acid dimer" as used herein pertains to the dimerized product of the reaction of two or more than two mono- or polyunsaturated fatty acids. Fatty acid dimers of these kinds are well known in the prior art and exist typically in the form of mixtures.

Aminated dimer fatty acids (also known as aminated dimerized fatty acids or dimer acids) is the term used to refer to mixtures produced by oligomerization of unsaturated fatty acids. Starting materials used may be unsaturated $C_{12}$ to $C_{22}$ fatty acids. Depending on the number and position of the double bonds in the $C_{12}$ to $C_{22}$ fatty acids used for producing the dimer fatty acids, the amine groups of the dimer fatty acids are joined to one another by hydrocarbon radicals which have predominantly 24 to 44 carbon atoms. These hydrocarbon radicals may be unbranched or branched and may have double bonds, $C_6$-cycloaliphatic hydrocarbon radicals or $C_6$-aromatic hydrocarbon radicals, in which case the cycloaliphatic radicals and/or the aromatic radicals may also be present in condensed form. The radicals which join the amine groups of the dimer fatty acids are preferably not aromatic hydrocarbon radicals, and very preferably not unsaturated bonds. Particularly preferred are dimers of $C_{18}$ fatty acids, i.e., fatty acid dimers having 36 carbon atoms. They are obtainable for example by dimerization of oleic acid, linoleic acid and linolenic acid and also mixtures thereof. The dimerization may be followed by hydrogenation and subsequently by amination.

In one particular embodiment the saturated alicyclic compound is

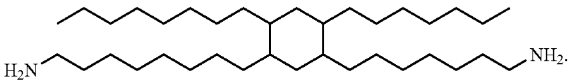 [SMILES: CCCCCCCCC1CC(CCCCCCC)C(CCCCCCCN)CC1CCCCCCCCN]

In one particular embodiment the saturated alicyclic compound is

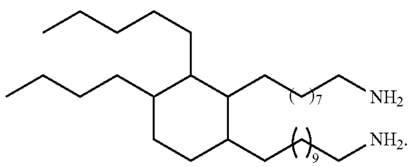

One specific embodiment are polymers which comprise at least one aminated dimer fatty acid in incorporated form. An even more specific embodiment are polymers which comprise the compound

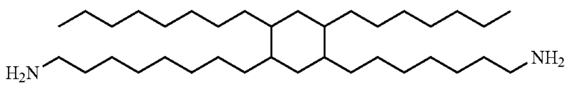 [SMILES: CCCCCCCCC1CC(CCCCCCC)C(CCCCCCCN)CC1CCCCCCCCN]

or

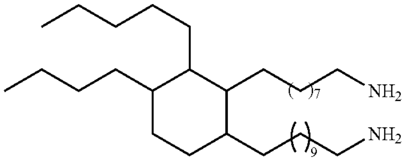

in incorporated form.

In a further preferred embodiment the at least one crosslinker is a mixture comprising an oligomer/polymer which has at least one amide group and a saturated alicyclic compound which has at least two primary amine groups.

In another preferred embodiment the at least one crosslinker is a mixture comprising an oligomer/polymer which has at least one amide group, and oligomer/polymer which comprise in copolymerized form at least one saturated alicyclic compound which has at least two primary amine groups.

In a further preferred embodiment the at least one crosslinker is a diamine compounds selected from compounds of the formulae (I), (II) and (III), (I)

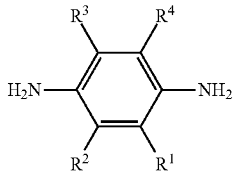

(II)

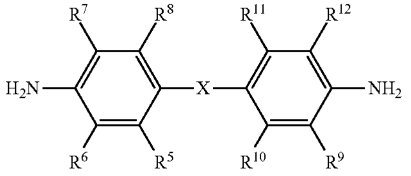

(III)

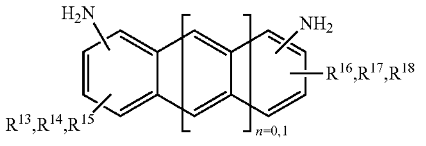

where $R^1$, $R^2$, $R^3$ and $R^4$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, $R^5$, $R^6$, $R^7$, $R^8$, $R^9$, $R^{10}$, $R^{11}$ and $R^{12}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, $R^{13}$, $R^{14}$, $R^{15}$, $R^{16}$, $R^{17}$ and $R^{18}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by $R^a$ and where the aryl group is unsubstituted or substituted by $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxyl, carboxyl, amino, $C_6$-$C_{12}$ aryl, where the aryl group is unsubstituted or substituted by $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl. Examples of $C_1$-$C_4$ alkyl groups are, in particular, methyl, ethyl, propyl, isopropyl, n-butyl, 2-butyl, sec-butyl and tert-butyl.

Examples of $C_1$-$C_6$ alkyl groups are, in particular, the aforementioned $C_1$-$C_4$ alkyl groups and also n-pentyl and n-hexyl.

$C_1$-$C_4$ haloalkyl is preferably one of the aforementioned $C_1$-$C_4$ alkyl groups which has preferably 1, 2, 3, 4 or 5, preferably 1, 2 or 3, halogen substituents. This includes, for example, trifluoromethyl.

Halogen is fluorine, chlorine, bromine and iodine, preferably fluorine, chlorine and bromine.

Unsubstituted $C_6$-$C_{14}$ aryl is preferably phenyl, naphthyl, anthracenyl, phenanthrenyl, naphthacenyl and more particularly is phenyl or naphthyl. Substituted $C_6$-$C_{14}$ aryl has preferably 1, 2, 3, 4 or more than 4 radicals, preferably selected from halogen, nitro, cyano, $C_1$-$C_4$ alkyl and $C_1$-$C_4$ haloalkyl. Examples of $C_1$-$C_4$ alkyl-substituted $C_6$-$C_{14}$ aryl are tolyl, xylyl, mesityl.

$C_1$-$C_6$ alkylene is preferably $—CH_2—$, $—CH_2—CH_2—$, $—CH_2—CH_2—CH_2—$, $—CH_2—CH_2—CH_2—CH_2—$ or $—C(CH_3)_2—$.

In one preferred embodiment the at least one crosslinker is a compound of the formula (I) or (II), where $R^2$, $R^3$, $R^5$, $R^6$, $R^7$, $R^8$, $R^{10}$ and $R^{11}$ are hydrogen, $R^1$ and $R^4$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group is unsubstituted or substituted by $R^a$ and where the aryl group is unsubstituted or substituted by $R^b$, $R^9$ and $R^{12}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group is unsubstituted or substituted by $R^a$ and where the aryl group is unsubstituted or substituted by $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxyl, carboxyl, amino, $C_6$-$C_{12}$ aryl, where the aryl group is unsubstituted or substituted by $R^c$, $R^b$ is selected from halogen, nitro, cyano, amino, $C_1$-$C_4$ alkyl and $C_1$-$C_4$ haloalkyl, and $R^c$ is selected from halogen, nitro, cyano, $C_1$-$C_4$ alkyl and $C_1$-$C_4$ haloalkyl.

In one particularly preferred embodiment the at least one crosslinker is a compound of the formula (I.a) or (II.a)

(I.a)

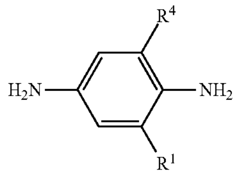

(II.a)

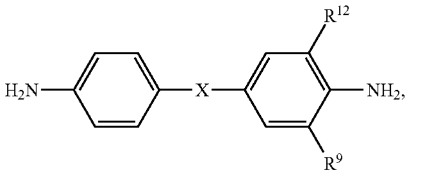

where $R^1$, $R^4$, $R^9$ and $R^{12}$ and X have the following meanings

| $R^1$ | $R^4$ |
|---|---|
| Hydrogen | Hydrogen |
| Hydrogen | Nitro |
| Hydrogen | Trifluoromethyl |
| Chloro | Trifluoromethyl |
| Nitro | Trifluoromethyl |
| Nitro | Nitro |
| Chloro | Chloro |
| Trifluoromethyl | Trifluoromethyl |
| tert-Butyl | tert-Butyl |

| X | $R^9$ | $R^{12}$ |
|---|---|---|
| Oxygen | Nitro | Methyl |
| Methylene | Methyl | Nitro |
| Carbonyl | Trifluoromethyl | Methyl |
| Bond | Nitro | Methyl |
| Sulfur | Hydrogen | Methyl |
| Oxygen | Trifluoromethyl | Trifluoromethyl |
| Oxygen | Fluoro | Fluoro |
| Oxygen | Cyano | Cyano |
| Oxygen | Nitro | Nitro |
| Carbonyl | Trifluoromethyl | Trifluoromethyl |
| Carbonyl | Fluoro | Fluoro |
| Carbonyl | Cyano | Cyano |
| Carbonyl | Nitro | Nitro |

In a further preferred embodiment the crosslinker is selected from compounds of the formulae (III.a) and (III.b):

(III.a)

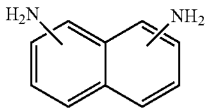

(III.b)

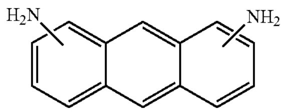

In one specific configuration the crosslinker is selected from compounds (III.a1) and (III.b1):

(III.a1)

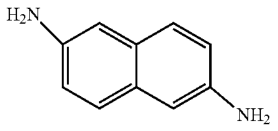

(III.b1)

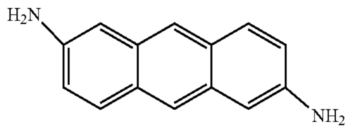

In a further preferred embodiment the at least one crosslinker is one di(aminophenyl) compounds in which the two aminophenyl rings are joined to one another via an aliphatic group which has a carbocyclic radical.

Di(aminophenyl) compounds used as crosslinker (or as diamine source) have two aminophenyl rings which are joined to one another. The compounds are therefore primary diamines. In one embodiment each phenyl ring here has only a single amino group. It is likewise conceivable, however, for the phenyl rings independently of one another to have two or three amino groups. The compounds are of low molecular mass and are not polymers. As well as the amino groups, the phenyl rings may have further substituents, such as alkyl or halogen groups. The two aminophenyl rings are joined to one another via an aliphatic group. Aliphatic groups consist only of carbon and hydrogen and are not aromatic. The di(aminophenyl) compounds used as crosslinker (or as diamine source), other than the two phenyl rings, preferably have no further double or triple bonds. The aliphatic group has a carbocyclic radical. Carbocyclic radicals are hydrocarbon rings which may have, for example, 4 to 7 carbon atoms, preferably 5 or 6 carbon atoms. This carbocyclic radical may comprise double bonds of the phenyl rings. The carbocyclic group preferably has only a single aliphatic hydrocarbon ring. With preference the aliphatic group has a total of 5 to 15 carbon atoms, more particularly 6 to 8 carbon atoms. Because of the aliphatic group between the carbocyclic radicals, the two phenyl rings are not conjugated.

In accordance with the invention it has surprisingly been found that PK crosslinked with such di(aminophenyl) compounds exhibits particularly advantageous properties. More particularly the crosslinked PK exhibits improved thermal stability and increased mechanical stability.

In one preferred embodiment the di(aminophenyl) compound used as crosslinker (or as diamine source) is a fused compound in which only one of the two phenyl rings is fused with the carbocyclic radical. Fusion (condensation) refers to the joining of an additional ring onto a ring of a cyclic molecule. The two fused rings share two carbon atoms and hence a C—C double bond of the phenyl ring. The use of such fused crosslinkers has the advantage that a particularly rigid and regular connection can be formed between the PK chains, thus enabling particularly high temperature stability and rigidity of the products.

The amino groups of the di(aminophenyl) compound used as crosslinker (or as diamine source) may be present in principle at any desired positions of the phenyl group, i.e., in ortho-, meta- or para-position in relation to the aliphatic connection of the two phenyl rings. In the embodiment wherein each phenyl group has only a single amino group, it is preferred for the two amino groups to be as far as possible from one another. This can be achieved if the two amino groups are attached at the para-position in relation to the aliphatic connection and/or to the 4- and 4'-position of the phenyl rings. In one preferred embodiment, therefore, the diaminodiphenyl compound is a 4,4'-diaminodiphenyl compound. The advantage of amino groups as far apart from one another as possible may generally be that it reduces the development of unwanted intramolecular reactions wherein a crosslinker enters into two bonds to the same PK polymer chain. Such intramolecular reactions with the crosslinker may disrupt the crystalline structure of the PK, without being active in crosslinking, and may hence reduce the stability of the product.

In one preferred embodiment of the invention the di(aminophenyl) compound used as crosslinker (or as diamine source) is an asymmetric compound.

In one preferred embodiment of the invention the di(aminophenyl) compound used as crosslinker (or as diamine source) is a compound of the general formula (IV)

(IV)

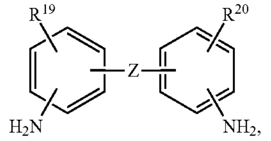

where $R^{19}$ and $R^{20}$ independently of one another are selected from hydrogen, substituted or unsubstituted alkyl having 1 to 20 carbon atoms, more particularly having 1 to 4 carbon atoms, more particularly methyl or ethyl; substituted or unsubstituted aryl having 5 to 12 carbon atoms; F and Cl, and where Z is the aliphatic group which has a carbocyclic radical. In this case each phenyl ring may have one, two or three radicals $R^{19}$ or $R^{20}$, which are selected independently of one another. Preferably a phenyl ring has only one radical $R^{19}$ and/or $R^{20}$. More preferably the radicals $R^{19}$ and $R^{20}$ are each H. Crosslinkers without additional radicals $R^{19}$ and $R^{20}$ have relatively good availability and can be processed to give crosslinked PKs of relatively high stability.

The radical Z may be joined to each phenyl radical via two or via one bond. Preferably the radical Z is joined to one phenyl radical via two bonds and to the second phenyl radical via one bond. In a further preferred embodiment of the invention the crosslinker is a compound of the general formula (IV.a)

(IV.a)

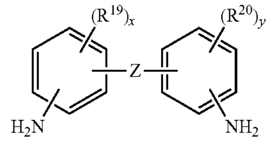

where x is 3 or 4 depending on the number of bonds of the $R^{19}$-substituted phenyl ring to the group Z, y is 3 or 4 depending on the number of bonds of the $R^{20}$-substituted phenyl ring to the group Z;

in each case the radicals $R^{19}$ independently of one another are selected from hydrogen, unsubstituted or substituted or alkyl having 1 to 20 carbon atoms, unsubstituted or substituted or aryl having 5 to 14 carbon atoms, F and Cl, in each case the radicals $R^{20}$ independently of one another are selected from hydrogen, unsubstituted or substituted or alkyl having 1 to 20 carbon atoms, unsubstituted or substituted or aryl having 5 to 14 carbon atoms, F and Cl, Z is an aliphatic group which has a carbocyclic radical, with Z being joined to each of the two phenyl rings via one or via two bonds.

Z is bonded to the phenyl ring substituted by $R^{19}$ preferably via two bonds. In that case x in the compounds (IV.a) is 3. Z is bonded to the phenyl ring substituted by $R^{20}$ preferably via one bonds. In that case y in the compounds (IV.a) is 4. Specifically x is 3 and y is 4. Z more particularly forms, with the two phenyl rings, an indane framework to which a phenyl ring is bonded.

In the compounds of the formulae (IV) and (IV.a), alkyl having 1 to 20 carbon atoms preferably encompasses the above-stated definition for $C_1$-$C_6$ alkyl and additionally n-heptyl, n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, arachidyl and the constitutional isomers thereof. Particularly preferred is alkyl having 1 to 4 carbon atoms, more particularly methyl or ethyl.

Substituted alkyl having 1 to 20 carbon atoms has at least 1 (e.g., 1, 2, 3, 4 or more than 4) substituent(s), preferably selected from halogen, nitro, cyano and $C_1$-$C_4$ alkoxy. Substituted alkyl is specifically $C_1$-$C_4$ haloalkyl, which preferably has 1, 2, 3, 4 or 5, preferably 1, 2 or 3, halogen substituents. This includes, for example, trifluoromethyl.

In the compounds of the formulae (IV) and (IV.a), unsubstituted aryl having 5 to 14 carbon atoms is preferably phenyl, naphthyl, anthracenyl and phenanthrenyl, more particularly phenyl or naphthyl. Unsubstituted aryl having 5 to 12 carbon atoms is more particularly phenyl or naphthyl. Substituted aryl having 5 to 14 carbon atoms or substituted aryl having 5 to 12 carbon atoms has preferably 1, 2, 3, 4 or more than 4 radicals, preferably selected from halogen, nitro, cyano, $C_1$-$C_4$ alkyl and $C_1$-$C_4$ haloalkyl. Examples of substituted aryl having 5 to 14 carbon atoms or substituted aryl having 5 to 12 carbon atoms are tolyl, xylyl, mesityl.

In the compounds of the formula (IV.a) the radicals $R^{19}$ are preferably selected from hydrogen, substituted or unsubstituted alkyl having 1 to 4 carbon atoms, F and Cl. More preferably the radicals $R^{19}$ are selected from hydrogen and unsubstituted alkyl having 1 to 4 carbon atoms.

In the compounds of the formula (IV.a) the radicals $R^{20}$ are preferably selected from hydrogen, substituted or unsubstituted alkyl having 1 to 4 carbon atoms, F and Cl. More preferably the radicals $R^{20}$ are selected from hydrogen and unsubstituted alkyl having 1 to 4 carbon atoms.

With preference each phenyl ring has no, one or two radicals $R^{19}$ or $R^{20}$ which are different from hydrogen. In one specific embodiment the radicals $R^{19}$ and $R^{20}$ are all hydrogen. Compounds of the formula (IV.a) in which the radicals $R^{19}$ and $R^{20}$ are all hydrogen have relatively good availability and can be processed to crosslinked PKs of relatively high stability.

In one preferred embodiment the crosslinker is a compound of the general formula (V)

(V)

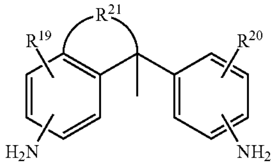

where $R^{19}$ and $R^{20}$ independently of one another are selected from H, substituted or unsubstituted alkyl having 1 to 20 carbon atoms, more particularly having 1 to 4 carbon atoms, more particularly methyl or ethyl, substituted or unsubstituted aryl having 5 to 12 carbon atoms, F and Cl, and where $R^{21}$ is a carbocyclic radical which has 2 to 3 carbon ring atoms and which may be substituted by at least one alkyl group having 1 to 4 carbon atoms, more particularly methyl or ethyl. With particular preference the radicals $R^{19}$ and $R^{20}$ are each H. The carbocyclic radical $R^{20}$ is therefore a pentyl or hexyl radical. Such crosslinkers have the advantage that a particularly good combination of temperature stability and mechanical stability of the crosslinked PKs can be obtained.

In one preferred embodiment the crosslinker is a compound of the general formula (V.a):

(V.a)

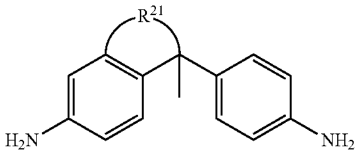

where $R^{21}$ is selected as indicated above. Such crosslinkers have the advantage that a particularly good combination of temperature stability and mechanical stability of the crosslinked PKs can be obtained.

In one preferred embodiment the crosslinker has the formula (V.a1):

(V.a1)

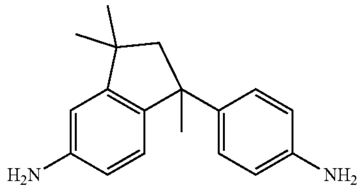

In the experiments carried out, the compound resulted in a particularly advantageous combination of temperature stability and mechanical stability of the crosslinked PKs. The chemical designation is 1-(4-aminophenyl)-1,3,3-trimethylindan-5-amine (CAS No. 54628-89-6).

In a further preferred embodiment the crosslinker has the formula (V.b1):

(V.b1)

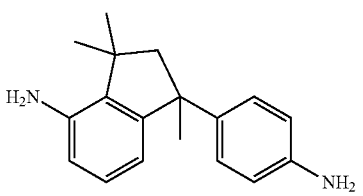

In the experiments carried out, the compound likewise results in a particularly advantageous combination of temperature stability and mechanical stability of the crosslinked PKs. The chemical designation is 1-(4-aminophenyl)-1,3,3-trimethylindan-6-amine.

In another preferred embodiment the crosslinker features a mixture of compounds of the formula (V.a1) and (V.b1). In the experiments carried out, this crosslinker likewise results in a particularly advantageous combination of temperature stability and mechanical stability of the crosslinked PKs.

In a further preferred embodiment the crosslinker has the formula (VII):

(VII)

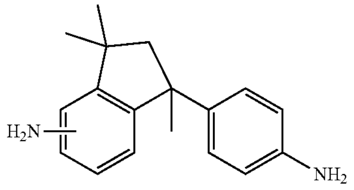

In the experiments carried out, this crosslinker likewise results in a particularly advantageous combination of temperature stability and mechanical stability of the crosslinked PKs. The chemical designation is 1-(4-aminophenyl)-1,3,3-trimethylindanamine (CAS No. 68170-20-7). In this case the amino group on the aromatic ring of the indane may occur at all positions. Likewise encompassed are mixtures of 1-(4-aminophenyl)-1,3,3-trimethylindanamines in which the amino group is located at different positions on the aromatic ring of the indane.

It is preferred in the invention to use a single specific crosslinker, in order to obtain physical properties of maximum uniformity. It is, however, also possible to use mixtures of two or more crosslinkers.

The process of the invention relates to a crosslinking reaction in which the polymer chains of the polyketones are joined to one another covalently and intramolecularly.

Step I)

In step i) a mixture is provided which comprises the polyketone and the crosslinker. The mixture provided in step i) may be produced by customary compounding methods. In step i) preferably the at least one polyketone, the at least one crosslinker, optionally a filling and reinforcing agent and optionally a further additive different therefrom are subjected to melt-mixing or dry mixing (compounding).

In the case of mixing in the melt, or melt-mixing, the polymers are heated beyond their melting temperature and mixed intensively by rolling, kneading or extruding. The temperature in step i) in this case is established preferably such that the mixture has good processability and has a viscosity suitable for compounding. In step i), moreover, the temperature is preferably established such that there is as yet no substantial reaction between the polyketone and the crosslinker. In addition the residence time at temperatures at which there is already a reaction between the PK and the crosslinker ought to be kept as short as possible. Unlike PAEK, for which the reactivity of the reacting carbonyl groups is lowered by mesomeric effects of the adjacent phenylene groups, the aminic crosslinking of PK with the crosslinker described in the invention preferably begins in the melt itself. In the invention there is no need for covalent attachment of the crosslinkers to the PK via aminic bonds to take place already, as in the case of the processes described in the prior art. This is advantageous since in accordance with the invention an additional reaction step of this kind is unnecessary, such a step requiring precise control in order to prevent unwanted onward reaction of the intermediates and resultant premature crosslinking.

In one embodiment in step i) the at least one polyketone, the at least one crosslinker, optionally a filling and reinforcing agent and optionally a further additive different therefrom are fed into an extruder, mixed with plastication and optionally pelletized.

The temperature in step i) in the case of melt-mixing is preferably in the range from 220 to 260° C.

In another embodiment in step i) the at least one polyketone, the at least one crosslinker, optionally a filling and reinforcing agent and optionally a further additive different therefrom are preferably subjected to dry mixing. The stated components may be mixed with any known dry mixing technique. The product is a dry mixture (dry blend) of polyketone, the at least one crosslinker, optionally the filling and reinforcing agent and optionally a further additive different therefrom.

The temperature in step i) in the case of dry mixing is below the softening range of PK, preferably in the range from 0° C. to 100° C.

In the production of the mixture, there is intensive mixing by suitable means, such as stirring or kneading devices, in order to achieve uniform distribution of the crosslinker in the polymer. This is very important in order to obtain uniform physical stability properties. The crosslinkable mixture after production is preferably processed further in step ii) without further intermediate steps which alter the composition.

In the case of mixing (compounding) it is possible to obtain an intermediate, such as pellets, for example. These intermediates are stable for a relatively long time at temperatures in the region of less than 80° C., preferably of less than 50° C., specifically at ambient temperature and below, and may, for example, be put into interim storage and/or transported to a different location and processed further.

In one particularly preferred embodiment of the invention, the mixture contains no solvent. Specifically no external solvent is added to the mixture. In the invention it has surprisingly been found that mixtures of the PK and of the crosslinker can be processed without using a solvent, with an intimate mixing taking place.

The mixture is preferably heated to a temperature at which it is in a liquid or flowable (plastified) form. In order to obtain a homogeneous mixture, it is preferred here to select temperature and residence time such that there is no significant crosslinking.

In one preferred embodiment the crosslinker is added continuously to the PK for the purpose of producing a mixture in step i). In this case the components may be in liquid or in solid form. A particularly uniform mixture can be obtained in this way. The crosslinker is preferably added with intimate mixing, such as with stirring, kneading, rolling and/or extruding, for example. In one preferred embodiment the crosslinker is supplied in the form of a concentrate. This has the advantage that the crosslinker can be metered more effectively, hence allowing the uniformity of the mixture to be improved. Overall, with continuous addition of the crosslinker, a particularly homogeneous mixture can be obtained, and so the crosslinking achieved is particularly regular. In this way it is possible to avoid the formation of regions with different degrees of crosslinking, which can lead to inhomogeneities and possibly to damage to the product under thermal or mechanical loading. Particularly good properties can be achieved in this way in terms of the temperature stability and mechanical stability.

Step II)

In step ii) a molding is produced from the mixture. The step ii) of producing the molding encompasses all measures by which the mixture is brought into a three-dimensional shape which is retained in the fully cured, crosslinked state. The molding is produced preferably by means of shaping processes of the kind customary for thermoplastics. It is preferred here for the molding to be produced before crosslinking and/or during crosslinking. In this context it is generally not critical if the mixture used in step ii) already includes small fractions of crosslinked products. With particular preference the shaping takes place before step iii), because the mixture prior to crosslinking advantageously is thermoplastically processable and shapeable, in particular by compression molding, extrusion, injection molding and/or 3D printing.

If the components are mixed in step i) by dry mixing, the dry mixture is melted in step ii) and subjected as described above to a shaping step.

In one embodiment steps i) and ii) run separately one after the other.

In one preferred embodiment the molding is produced in step ii) by thermoplastic forming. This means that the mixture, in a state in which it is not, and/or at least not significantly, crosslinked, can be shaped from the melt, since otherwise thermoplastic processing would no longer be possible. If there are too many crosslinking sites, the PK intermediate is no longer flowable and can no longer be readily shaped thermoplastically. Prior to shaping, the mixture ought to be exposed to the high processing temperatures only for a short period. Thermoplastic processing is therefore carried out preferably such that the residence time of the mixture in the apparatus is as small as possible. It is preferred here for the processing to be carried out such that the major part of the crosslinking reaction, and in this case for example more than 80%, more than 90% or more than 95% of the crosslinks, takes place only after shaping, i.e., in step iii).

In one preferred embodiment the mixture in step ii) is processed by extruding, compression molding, injection molding and/or 3D printing and undergoes forming in this process. These methods are especially suitable for the simple and efficient processing of thermoplastic polymer compositions. "Forming" means that a shape first imparted is later changed again. Typical forming methods are bending, embossing, stretching and thermoforming, etc.

Extruding here may take place by known methods. Extruding (extrusion) sees solid to high-viscosity curable compositions being pressed out under pressure continuously from a shaping aperture (also called a die or orifice). This produces articles having the same cross section as the aperture, called extrudate, in theoretically any desired length. Extruding takes place preferably at a temperature of at least 220° C., preferably between 220° C. and 265° C., and more particularly between 230° C. and 250° C.

Compression molding is a process in which the molding composition is introduced into the preheated cavity. The cavity is then closed using a plunger. The pressure causes the molding composition to take on the shape dictated by the mold. Compression molding takes place preferably at a temperature of at least 220° C., preferably between 220° C. and 265° C., and more particularly between 230° C. and 250° C.

Injection molding (or the injection molding process) is a shaping process which is used in plastics processing. It involves the plastic being plastified with an injection molding machine and injected under pressure into a mold, the injection mold. Within the mold, cooling causes the material to revert to the solid state, and after the mold is opened the material is removed in the form of a molding. The cavity of the mold in this case determines the shape and the surface structure of the product.

In 3D printing it is possible, for example, to utilize the technique known as fused deposition modeling (FDM) in order to shape the molding compositions of the invention. FDM is based in principle on the three elements of a print bed (onto which the desired object is printed), a filament coil (which supplies the printing material) and a print head (also called extruder). The filament consisting of the thermoplastic molding composition is uncoiled during the process, supplied to the extruder, where it is melted, and deposited layer by layer on the printing plate.

Processing is accomplished with particular preference by extruding and subsequent injection molding. With these processes, the mixture of the PK and the crosslinker is melted, if it is not yet in a liquid form. The mixture in step ii) is introduced preferably into an extruder, an injection molding machine or a compression molding press, melted at high temperatures, in the range from 220° C. to 250° C., for example, and brought into a desired shape.

Step III)

Step iii) comprises the thermal treatment of the molding at a temperature at which PK is crosslinked, so producing the crosslinked molding. This allows the PK to be crosslinked intermolecularly with the crosslinker. The polyamide is hydrolyzed and cleaved into diamine components. On crosslinking, two imine bonds are formed between two keto groups of the PK chains and the two amino groups of the diamine liberated from the crosslinker. The resulting bridge in the form of an imine is also referred to as a Schiff base, since the imine nitrogen does not carry a hydrogen atom but is instead connected to an organic molecule. The crosslinking here is very largely complete, and so as far as possible all of the amino groups of the crosslinker used react with the carbonyl groups of the PK. Advantages of complete crosslinking are an increased heat distortion resistance and an increased stiffness (modulus). In spite of this, the term "crosslinked" is also intended to embrace merely partial crosslinking. Merely partial crosslinking may exist if the amount of crosslinker used was not enough to fully incorporate all of the PK chains into the network. In that case the material generally possesses a higher elongation at break than the completely crosslinked material. The imine bonds give the molding a high stability. With preference in the invention the molding is a molding based on PK. "Based on PK" here means that the PK is the essential structure-imparting polymer component of the molding. In one embodiment the PK is preferably the only polymer component of the molding.

The temperature in step iii) may be set at a relatively high level, since the crosslinkers which can be used in the invention have relatively high melting and boiling points. This is advantageous because such crosslinking reactions are generally favored at high temperature. Preferably, however, the temperature is below the melting range of PK and below the softening point of the as yet not fully crosslinked molding.

It has surprisingly emerged that in the system according to the invention, the crosslinking reactions take place even below the melting range of the polymer and of the molding. This was unexpected, the general assumption being that crosslinking reactions occur preferably at temperatures above the melting range of the polymer and of the molding.

In the prior art it is assumed, furthermore, that such crosslinking reactions take place relatively rapidly, within minutes or a few hours. In accordance with the invention it has been found that the crosslinked PK can have particularly advantageous properties if the heating of the molding in step iii) is carried out, depending on the crosslinking temperature, preferably over a period of at least 1 hour, as for example from 1 hour up to 2 days. It has been found that the thermal stability, the elasticity modulus and the tensile strength can be substantially increased by such a thermal treatment.

It has been found in particular that the thermal treatment is able to improve the stiffness of the samples at elevated temperatures. In this context it has been observed that a thermal treatment for a defined time can significantly improve the stiffness, with the subsequent possibility of saturation, so that the stiffness is not improved or not substantially improved on further thermal aftertreatment. On further thermal aftertreatment, however, there is generally an improvement in the heat distortion resistance. It has been found that the heat distortion resistance is able to rise even on prolonged thermal aftertreatment.

In one preferred embodiment the molding obtained in step ii) is subjected to a thermal treatment over a relatively short period. The thermal treatment of the molding in step iii) takes place preferably from at most 6 hours, as for example from 5 minutes to 6 hours, more preferably from 0.5 minute to 5 hours, and more particularly from 1 hour to 4 hours. An advantage of this is that it is possible to reduce autocrosslinking reactions of the aliphatic polyketone that take place in parallel.

Alternatively, however, it may also be useful to subject the molding in step iii) to the thermal treatment for a longer time, preferably of at least 6 h, more particularly for more than 2 days. In another embodiment of the invention, the thermal treatment is carried out over a period of 2 to 10, more particularly for 2 to 6, days. The thermal treatment takes place preferably in the absence of oxygen.

In one preferred embodiment the thermal treatment in step iii) takes place at a temperature of at least 160° C., preferably at least 180° C. The temperature in step iii) is preferably between 160° C. and 240° C., more preferably between 190° C. and 230° C. and more particularly between 190° C. and 210° C. At such temperatures an efficient three-dimensional crosslinking can take place sufficiently quickly without the articles produced thermoplastically being adversely affected, by unwanted deformation of the moldings, for example.

After the crosslinking, the moldings are cooled and can be passed on for use or processed further.

As described above, both the mixture in step i) and the molding may comprise filling and reinforcing agents and/or optionally an additive different from these. The crosslinked PK in this case forms a matrix in which any filling and reinforcing agents and/or additives present are in uniform distribution.

Suitable filling and reinforcing agents are selected from glass fibers in the form, for example, of woven or nonwoven glass fabrics or glass mats, glass silk rovings or chopped glass silk, wollastonite, calcium carbonate, glass beads, finely ground quartz, Si nitride and boron nitride, amorphous silica, asbestos, magnesium carbonate, calcium silicate, calcium metasilicate, kaolin, mica, feldspar, talc and mixtures thereof.

Suitable additives are selected from antioxidants, UV stabilizers and heat stabilizers, lubricants and mold release agents, colorants, such as dyes and pigments, nucleating agents, plasticizers and mixtures.

The filling and reinforcing agents may be used for example in an amount of up to 80 wt %, as for example from 0.1 wt % to 80 wt %, especially from 1 wt % to 60 wt %, based on the total weight of the components used for producing the molding.

The additives may be used for example in an amount of in each case up to 20 wt %, as for example from 0.1 wt % to 20 wt %, more specifically from 0.1 wt % to 18 wt %, based in each case on the total weight of the components used for producing the molding.

The molding is obtainable in particular by the processes of the invention which are described in the context of this invention. The molding preferably has the advantageous properties described for the crosslinked PKs in the context of this invention. In the context of this invention the term "molding" denotes products of crosslinked PK which have a defined three-dimensional shape. There is no requirement here for the molding to be a defined article; instead it may also be, for example, a coating. The molding may consist of the crosslinked PK or may comprise it, in the form of a composite material or laminate, for example.

In one preferred embodiment the molding of the invention is thermally conditioned. In a first variant the molding of the invention is thermally conditioned over a period of 5 minutes to 6 hours. In a second variant the molding of the invention is thermally conditioned over a period of more than 6 hours up to several days. By means of the different variants it is possible to obtain advantageous properties that are different in each case.

The molding is preferably thermally conditioned over a period of 5 minutes to 6 hours and, relative to moldings of noncrosslinked PK, will exhibit advantageous, improved mechanical properties, characterized by increased tensile modulus, increased yield stress and increased yield strain. The molding of the invention conditioned thermally over a period of 5 minutes to 6 hours preferably has a tensile modulus of at least 1800 MPa, more particularly of at least 1900 MPa, and very preferably of at least 2000 MPa. The molding of the invention conditioned thermally over a period of 5 minutes to 6 hours preferably has a yield strength of at least 65 MPa, more particularly of at least 68 MPa, and very preferably of at least 70 MPa. The molding of the invention conditioned thermally over a period of 5 minutes to 6 hours preferably has an improved yield strain of at least 20%, and more preferably of at least 23%.

The molding is preferably conditioned thermally over a period of more than 6 hours up to several days, and exhibits advantageous elevated stiffnesses relative to moldings of noncrosslinked PK, these stiffnesses being characterized by a high tensile modulus and increased tensile strength. If crosslinking is excessive, however, there is a significant reduction in the yield strain. The molding conditioned thermally over a period of more than 6 hours up to several days preferably has a tensile modulus of at least 2000 MPa, more particularly of at least 2250 MPa and very preferably of at least 2500 MPa. More particularly the tensile modulus is between 2000 MPa and 3000 MPa or between 2250 MPa and 3000 MPa. The tensile modulus of noncrosslinked PK, conversely, is between 1400 and 1800 MPa. The tensile modulus is determined according to DIN EN ISO527-2.

It may be desirable not to crosslink the PK in the molding completely, as the elongation at break of the material may go down with increasing crosslinking. Preferably, therefore, the degree of crosslinking is tailored to the desired application, by way of the fraction of the crosslinker and the nature and duration of the thermal treatment, for example.

The degree of crosslinking is preferably not measured directly here; instead, through suitable testing methods, such as a high-temperature tensile test, for example, a determination is made of whether the molding has the desired properties. At very high temperatures, the determination of the dynamic modulus is appropriate.

The moldings can be used in particular in technical fields where high mechanical stability, and in particular high stiffness, are required. They are suitable especially for applications in the sectors of automotive, shipping, aerospace, rail vehicles, oil and gas industry, food and packaging industry and medical devices, and particularly as, or as a constituent of, sealing articles, preferably sealing rings and O-rings, bushes, films, powders, coatings, fibers, bearings, back-up rings, valves, thrust washers, coupling elements, snap hooks, pipes or conduits, cables, sheaths and jackets, housings. They are suitable especially for uses in which high chemical resistance and abrasion resistance are required. This relates in particular to applications in oil and gas production, in aerospace engineering and in the chemical industry, for the production there of safety-relevant components, and in the energy generation sector and the automotive industry. Applications likewise conceivable are as connectors and insulators in the electronics sector, since the crosslinking leads to good insulation capacity.

The processes, moldings and sealing articles of the invention achieve the object on which the invention is based. Relative to the noncrosslinked PK, they exhibit improved temperature stability and higher mechanical stability in conjunction with good processing properties. The moldings in particular have high stiffness especially above the glass transition temperature. The high stiffness is accompanied by reduced creep behavior at high temperatures. The improved temperature stability is manifested both at the maximum temperature and at the sustained service temperature. The products here exhibit very good chemical resistance and reduced combustibility, since the material, because of the crosslinking, does not melt and does not produce any drops of burning material.

Moreover, the moldings of the invention can be produced in a simple and efficient way by thermoplastic shaping processes. For example, they may be produced by simple extruding. The processes, furthermore, are environmentally friendly and can be carried out without risk to users, because the crosslinkers employed have relatively high boiling points and a low volatility.

The purpose of the examples below is to elucidate the invention but not to confine it to the embodiments specifically described.

EXAMPLES

In relation to the standards described, the versions valid on the filing date apply unless otherwise indicated.

Abbreviations:

DAPI: 1-(4-aminophenyl)-1,3,3-trimethylindan-6-amine and isomers thereof

PK: aliphatic polyetherketone (MVR: 60 $cm^3$/10 min (@ 240° C./2.16 kg), m.p.: 220° C.)

Working Example 1

The DAPI isomer mixture with the CAS number 68170-20-7 (crosslinker with the formula VII) is incorporated by mixing using a twin-screw compounder into a commercial PK having a melting point of about 220° C. and an MVR of 60 $cm^3$/10 min (at 240° C. and 2.16 kg weight loading) and the extrudate is chopped into pellets.

The pellets are processed to specimens by injection molding and are subsequently subjected likewise to a thermal aftertreatment in a vacuum oven over a period of 1 hour.

When the thermal aftertreatment was complete, a tensile test was carried out according to ISO 527-2 and the values were compared with noncrosslinked PK base material (table 1).

TABLE 1

| | PK base material | PK + 1% DAPI isomer mixture/aftertreated |
|---|---|---|
| Modulus: | 1680 ± 22 MPa | 1903 ± 8 MPa |
| Yield stress: | 61.4 ± 0.2 MPa | 68.2 ± 0.3 MPa |
| Yield strain: | 18.6 ± 0.3% | 23.1 ± 1.0% |
| Tensile strength: | Material flows | 48.4 ± 1.9 MPa |
| Elongation at break: | Material flows | 72.5 ± 14.2% |

As a result of the chemical postcrosslinking, the modulus of tensile elasticity of the PK has increased by around 13% relative to the noncrosslinked base material. There are also increases of around 11% in the yield stress and around 24% in the yield strain relative to the noncrosslinked base material.

Working Example 2

The DAPI isomer mixture with the CAS number 68170-20-7 (crosslinker with the formula VII) is incorporated by mixing using a twin-screw compounder into a commercial PK having a melting point of about 220° C. and an MVR of 60 $cm^3$/10 min (at 240° C. and 2.16 kg weight loading) and the extrudate is chopped into pellets.

The pellets are processed to specimens by injection molding and are subsequently subjected likewise to a thermal aftertreatment in a vacuum oven over a period of 2 hours.

When the thermal aftertreatment was complete, a tensile test was carried out according to ISO 527-2 and the values were compared with noncrosslinked PK base material (table 2).

TABLE 2

| | PK base material | PK + 1% DAPI isomer mixture/aftertreated |
|---|---|---|
| Modulus: | 1680 ± 22 MPa | 1915 ± 29 MPa |
| Yield stress: | 61.4 ± 0.2 MPa | 69.1 ± 0.6 MPa |
| Yield strain: | 18.6 ± 0.3% | 24.4 ± 0.7% |
| Tensile strength: | Material flows | 53.8 ± 5.6 MPa |
| Elongation at break: | Material flows | 46.4 ± 9.7% |

As a result of the chemical postcrosslinking, the modulus of tensile elasticity of the PK has increased by around 14% relative to the noncrosslinked base material. There are also increases of around 13% in the yield stress and 31% in the yield strain relative to the noncrosslinked base material.

In addition to the tensile experiments, rheological studies were carried out on an Anton Paar MCR-302 rheometer, showing the chemical postcrosslinking of the aliphatic polyketone with the DAPI crosslinker. Two moldings of the invention (PK with 1.00% DAPI, aftertreated thermally for 1 h, described in working example 2, and PK with 1.00% DAPI, aftertreated thermally for 2 h, described in working example 3) were studied in comparison to the standard base material (PK without thermal treatment). The test conditions are listed in table 3.

TABLE 3

| | |
|---|---|
| Strain | 0.1% |
| Angular frequency | 10 rad/s |
| Standard force | 0N, (start at 2 mm gap) |
| Temperature | 240° C. |
| Inert gas atmosphere in oven | Nitrogen |

Working Example 4

The DAPI isomer mixture with the CAS number 68170-20-7 (crosslinker with the formula VII) is incorporated by mixing using a twin-screw compounder into a commercial PK having a melting point of about 220° C. and an MVR of 60 $cm^3$/10 min (at 240° C. and 2.16 kg weight loading) and the extrudate is chopped into pellets.

The pellets are processed to specimens by injection molding and then subjected likewise to a thermal aftertreatment over a period of 6 days in a heating oven under inert gas atmosphere.

When the thermal aftertreatment was complete, a tensile test was carried out according to ISO 527-2 and the values were compared with noncrosslinked PK base material (table 4).

TABLE 4

| | PK base material | PK + 1% DAPI isomer mixture/aftertreated |
|---|---|---|
| Modulus: | 1680 ± 22 MPa | 3562 ± 81 MPa |
| Yield stress: | 61.4 ± 0.2 MPa | — |
| Yield strain: | 18.6 ± 0.3% | — |
| Tensile strength: | Material flows | 72.1 ± 6.4 MPa |
| Elongation at break: | Material flows | 2.5 ± 0.4% |

As a result of the postcrosslinking, the tensile modulus of elasticity of the PK has more than doubled relative to the noncrosslinked base material. The crosslinked material no longer exhibits ductile behavior and the maximum strength is approximately 10 MPa higher than for the noncrosslinked material. The crosslinking sites greatly limit the elasticity of the material, causing the elongation at break to reduce to 2.5%.

Whereas the noncrosslinked PK base material melts at about 220° C., melting is no longer observed for the postcrosslinked material.

Figure 2:
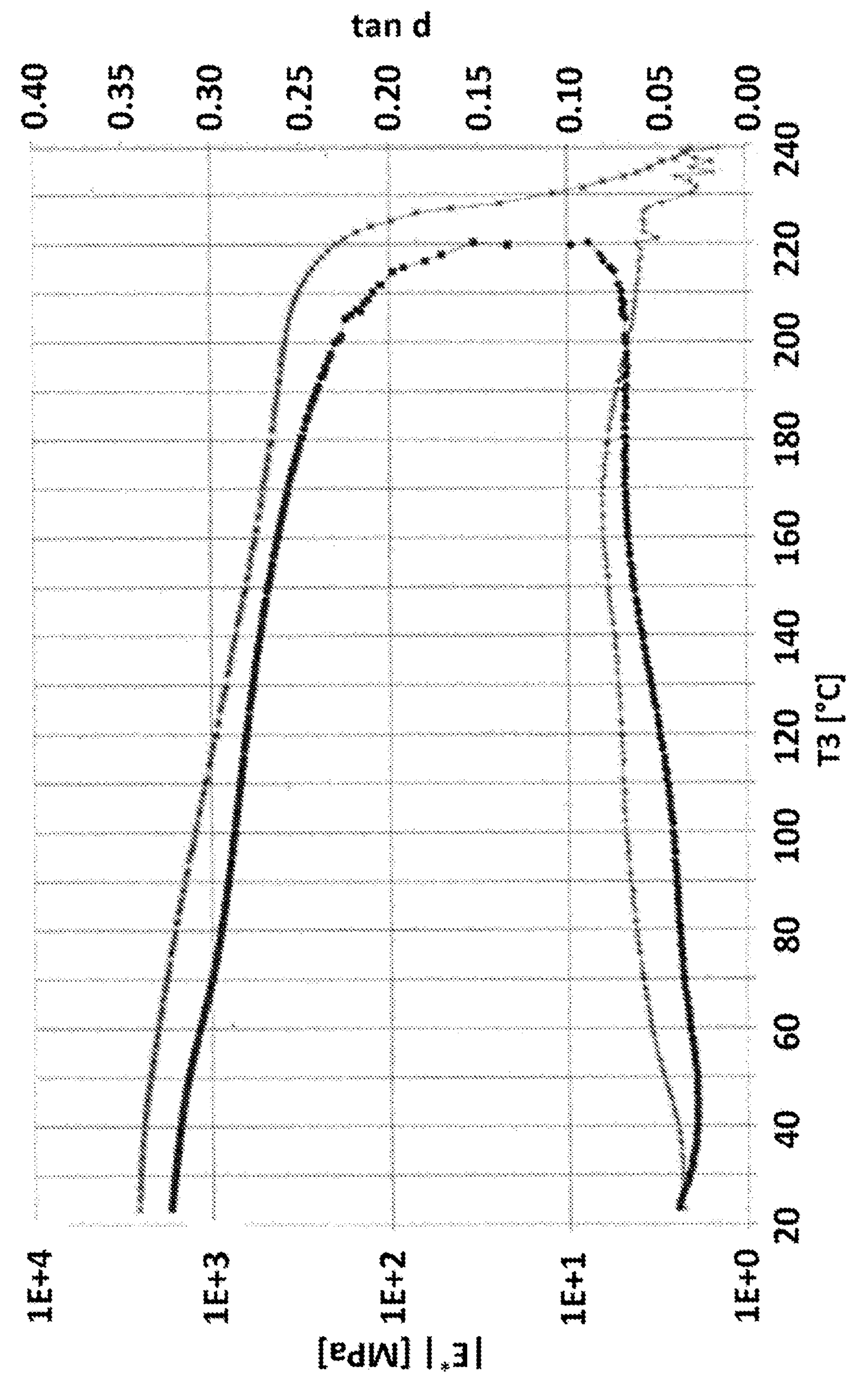
FIG. 2: Development of the complex dynamic modulus with increasing temperature of a molding of the invention (PK with 1.00% DAPI, thermally treated, measurement point indicated by asterisks) in comparison to the standard base material (PK without thermal treatment, measuring points indicated by squares).

The noncrosslinked base material and the postcrosslinked PK were tested by DMA in a T sweep, giving the result shown in FIG. 2. Dynamic mechanical analysis (DMA) is a thermal method for determining physical properties of plastics. The temperature gradient (temperature sweep) shows the development of the dynamic modulus and thus likewise of the stiffness over the measured temperature range.

The temperature gradients were measured with specimen strips (width around 4 mm, thickness around 3 mm, length around 45 mm) under the following conditions: heating rate 2 K/min, contact force 0.5 N, frequency 1.0 Hz, average strain 0.5%, strain amplitude +/−0.1%. The results are shown in graph form in FIG. 2.

FIG. 2 shows the development of the complex dynamic modulus with increasing temperature of the molding of the invention (PK with 1.0% DAPI, thermally treated, measurement points represented by asterisks) in comparison to the standard base material PK (PK without thermal treatment, measurement points represented by squares).

The results show that the PK crosslinked in accordance with the invention exhibits advantageous thermal properties. As already demonstrated by the ISO 527-2 tensile test, the material exhibits an increased modulus (cf. table 4) and an increased heat distortion resistance. Whereas the sharp drop in the modulus in the case of the noncrosslinked PK from around 210° C. is brought about by melting of the material, the loss of modulus in the case of the crosslinked material occurs not as a result of melting, but instead as a result of the development of cracks in the material.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A molding comprising a matrix from the crosslinking of an aliphatic polyketone with at least one diamine source as crosslinker with formation of imine groups, wherein the crosslinker is a saturated alicyclic compound which has at least two primary amino groups, selected from aminized dimer fatty acids, polymers which comprise aminated dimer fatty acids in copolymerized form, and mixtures thereof.

2. The molding as claimed in claim 1, which comprises at least one filling and reinforcing agent and/or an additive different therefrom.

3. A process for producing a molding, comprising the steps of i) providing a mixture comprising at least one aliphatic polyketone and at least one crosslinker, ii) producing a molding from the mixture obtained in step i), and iii) thermally treating the molding at a temperature at which the aliphatic polyketone becomes crosslinked, and where the crosslinker is selected from di(aminophenyl) compounds in which the two aminophenyl rings are joined to one another via an aliphatic group which has a carbocyclic radical, diamine compounds selected from compounds of the formulae (I), (II) and (III), (I)

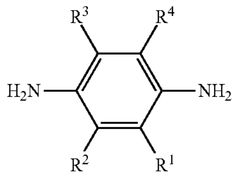

(II)

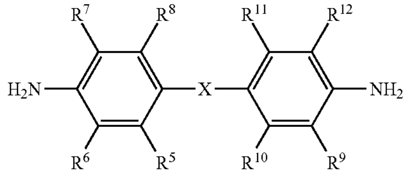

(III)

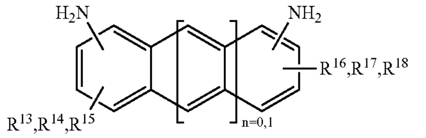

wherein $R^1$, $R^2$, $R^3$ and $R^4$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by Ra and where the aryl group is unsubstituted or substituted by $R^b$, $R^5$, $R^6$, $R^7$, $R^8$, $R^9$, $R^{10}$, $R^{11}$ and $R^{12}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by Ra and where the aryl group is unsubstituted or substituted by $R^b$, $R^{13}$, $R^{14}$, $R^{15}$, $R^{16}$, $R^{17}$ and $R^{18}$ independently of one another are selected from hydrogen, halogen, nitro, cyano, hydroxyl, amino, $C_1$-$C_6$ alkyl, $C_2$-$C_6$ alkenyl, $C_2$-$C_6$ alkynyl, $C_6$-$C_{14}$ aryl, where the alkyl group, alkenyl group and alkynyl group are unsubstituted or substituted by Ra and where the aryl group is unsubstituted or substituted by $R^b$, X is selected from a bond, oxygen, sulfur, carbonyl, sulfonyl, sulfoxide, $C_1$-$C_6$ alkylene, $C_2$-$C_6$ alkenylene and phenylene, $R^a$ is selected from halogen, nitro, cyano, hydroxyl, carboxyl, amino, $C_6$-$C_{12}$ aryl, where the aryl group is unsubstituted or substituted by $R^c$, $R^b$ is selected from halogen, nitro, cyano, amino, $C_1$-$C_4$ alkyl and $C_1$-$C_4$ haloalkyl, $R^c$ is selected from halogen, nitro, cyano, $C_1$-$C_4$ alkyl and $C_1$-$C_4$ haloalkyl, oligomers/polymers which have at least two amide groups, saturated alicyclic compounds which have at least two primary amine groups, and oligomers/polymers which comprise them in incorporated form, and mixtures thereof wherein the crosslinker is a saturated alicyclic compound which has at least two primary amino groups, selected from aminized dimer fatty acids, polymers which comprise aminated dimer fatty acids in copolymerized form, and mixtures thereof.

4. The process as claimed in claim 3, where in step i) the at least one aliphatic polyketone, the at least one crosslinker, optionally a filling and reinforcing agent and optionally a further additive different therefrom are subjected to melt-mixing or dry mixing.

5. The process as claimed in claim 3, where in step i) the at least one aliphatic polyketone, the at least one crosslinker, optionally a filling and reinforcing agent and optionally a further additive different therefrom are fed into an extruder, mixed while under plastication, and optionally pelletized.

6. The process as claimed in claim 3, where the aliphatic polyketone at 240° C. has a melt viscosity in the range from 2 $cm^3$/10 min to 200 $cm^3$/10 min, measured according to DIN ISO 1130.

7. The process as claimed in claim 3, where the mixture contains no added solvent.

8. The process as claimed in claim 3, where the temperature in step ii) is at least 220° C.

9. The process as claimed in claim 3, where the mixture in step ii) is processed by extrusion, compression molding, injection molding and/or 3D printing.

10. The process as claimed in claim 3, where the molding obtained in step ii) is subjected in step iii) to a thermal treatment for 5 minutes to 6 hours.

11. The process as claimed in claim 10, where the thermal treatment in step iii) takes place at a temperature of at least 160° C.

12. A molding obtained by the process as claimed in claim 3.

13. A polymer mixture comprising at least one polyketone (PK) and at least one crosslinker which is a saturated alicyclic compound which has at least two primary amino groups, selected from aminized dimer fatty acids, polymers which comprise aminated dimer fatty acids in copolymerized form, and mixtures thereof.

14. Sealing articles, thrust washers, back-up rings, valves, connectors, insulators, snap hooks, bearings, bushes, films, powders, coatings, fibers, sealing rings and O-rings, pipes and conduits, cables, sheaths and jackets, housings of an electrical or chemical application, consisting of or comprising a molding as claimed in claim 1.

15. The process as claimed in claim 3, wherein the crosslinker is the compound

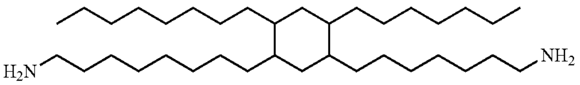

or oligomers/polymers which comprise this compound in copolymerized form.

16. The process as claimed in claim 3, where in step i) the at least one aliphatic polyketone, the at least one crosslinker, a filling and reinforcing agent and are fed into an extruder, mixed while under plastication, and pelletized.

17. The process as claimed in claim 3, where in step i) the at least one aliphatic polyketone, the at least one crosslinker, a filling and reinforcing agent and a further additive different therefrom are fed into an extruder, mixed while under plastication, and pelletized.

18. The process as claimed in claim 3, where in step i) the at least one aliphatic polyketone, the at least one crosslinker, a filling and reinforcing agent and optionally a further additive different therefrom are subjected to melt-mixing or dry mixing.

19. The process as claimed in claim 3, where in step i) the at least one aliphatic polyketone, the at least one crosslinker, a filling and reinforcing agent and a further additive different therefrom are subjected to melt-mixing or dry mixing.

20. The process as claimed in claim 3, where the temperature in step ii) is between 220° C. and 265° C.

21. The process as claimed in claim 3, where the temperature in step ii) is between 230° C. and 250° C.

22. The process as claimed in claim 3, where the molding obtained in step ii) is subjected in step iii) to a thermal treatment for 1 hour to 4 hours.

23. The process as claimed in claim 10, where the thermal treatment in step iii) takes place at a temperature between 160° C. and 240° C.

24. The process as claimed in claim 10, where the thermal treatment in step iii) takes place at a temperature between 190° C. and 230° C.

25. The process as claimed in claim 10, where the thermal treatment in step iii) takes place at a temperature between 190° C. and 210° C.

26. The process as claimed in claim 22, where the thermal treatment in step iii) takes place at a temperature between 190° C. and 230° C.

27. The process as claimed in claim 22, where the thermal treatment in step iii) takes place at a temperature between 190° C. and 210° C.

* * * * *